(12) United States Patent
Hawes

(10) Patent No.: US 7,904,198 B2
(45) Date of Patent: Mar. 8, 2011

(54) PICK AND PLACE GRIPPER

(75) Inventor: Richard John Hawes, Norwich (GB)

(73) Assignee: AEW Delford Systems Limited (GB)

( * ) Notice: Subject to any disclaimer, the term of this patent is extended or adjusted under 35 U.S.C. 154(b) by 1431 days.

(21) Appl. No.: 10/541,802

(22) PCT Filed: Oct. 27, 2004

(86) PCT No.: PCT/GB2004/004517
§ 371 (c)(1),
(2), (4) Date: Sep. 19, 2005

(87) PCT Pub. No.: WO2005/051812
PCT Pub. Date: Jun. 9, 2005

(65) Prior Publication Data
US 2006/0182603 A1 Aug. 17, 2006

(30) Foreign Application Priority Data

Oct. 28, 2003 (GB) .................................. 0325068.5
Jul. 7, 2004 (GB) .................................. 0415202.1
Aug. 9, 2004 (GB) .................................. 0417665.7

(51) Int. Cl.
*G06F 7/00* (2006.01)
(52) U.S. Cl. ..................... 700/230; 700/228; 198/459.6; 414/735
(58) Field of Classification Search .................. 700/230, 700/228, 213; 414/735, 729, 730, 618; 198/459.6
See application file for complete search history.

(56) References Cited

U.S. PATENT DOCUMENTS

| 4,026,421 A | * | 5/1977 | Lotz ........................... 414/790.4 |
| 4,911,608 A | | 3/1990 | Krappitz |
| 5,969,339 A | * | 10/1999 | McMurray et al. ....... 250/223 R |
| 2008/0131253 A1 | * | 6/2008 | Scott et al. .................... 414/729 |

FOREIGN PATENT DOCUMENTS

| DE | 3312609 A1 | 10/1984 |
| DE | 3718601 A1 | 8/1991 |
| DE | 19754972 A1 | 6/1999 |
| DE | 20203818 U1 | 6/2002 |

OTHER PUBLICATIONS

Translation of DE 20203818, 19754972 and 3312604.

* cited by examiner

*Primary Examiner* — Gene Crawford
*Assistant Examiner* — Ramya Prakasam
(74) *Attorney, Agent, or Firm* — Barnes & Thornburg LLP

(57) ABSTRACT

Tooling is described for securing to the movable end of a computer-controlled robotic arm, by which articles can be picked up, optionally rotated and lowered into a new position. The tooling comprises two blades each having a leading edge and trailing edge, movable between a first position in which their leading edges are separated by a large gap and a second position in which the leading edges overlap, or are in contact or are separated by a smaller gap. A movement restraining mechanism is included which comprises at least one resiliency deformable member located above the plane containing the two blades and spaced therefrom by a distance which is less than the thickness of each article to be picked up by the tooling. In use, as the tooling is lowered onto an article. the underside of the deformable member engages the upper surface of the article and becomes deformed in order to accommodate the thickness of the article before the blades make contact with a surface on which the article rests.

35 Claims, 17 Drawing Sheets

Closed

Open

PICK AND PLACE GRIPPER

FIELD OF INVENTION

Figure 1:
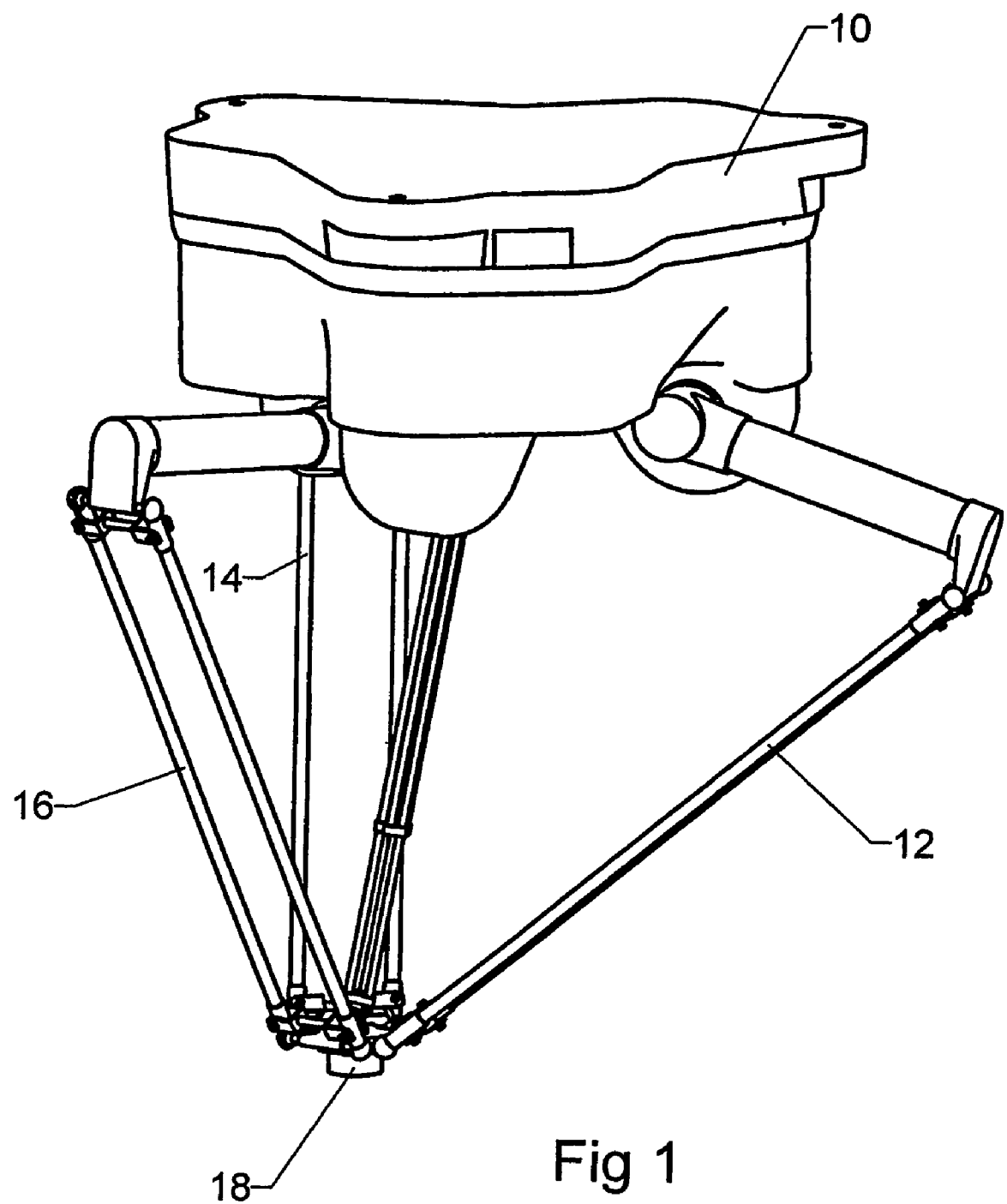

This invention concerns gripping devices (tooling) by which articles, especially but not exclusively portions of foodstuff, can be picked up from one place (typically a conveyor belt) moved and located at another place (typically onto another conveyor or into a container such as a tray on another conveyor).

BACKGROUND

In the food processing and packaging industry it is known to cut large pieces of foodstuff such as meat, into smaller, usually similarly sized, portions and then to pack the cut portions individually or more commonly in groups of two, three or more, for display (usually in chilled or frozen display cabinets) for selection by the public for purchase.

Thus pork and lamb are cut into chops, beef into steaks and bacon into thin slices. The cutting from the bulk product is often achieved using a rotating blade and the portions (i.e. chops or steaks) are allowed to fall one after another onto a moving conveyor belt.

An escapement mechanism may be provided so that the portions are separated along the length of the conveyor, and in general the portions will tend to fall in a similar way so that for example in the case of port chops the edge of each chop which is covered by a layer of fat may for example always be the leading (or trailing) edge of each chop in the line—depending on whether the bulk pork from which they are cut is fat side up or fat side down.

However there is no guarantee that the portions will be so aligned on the conveyor.

It is considered desirable for the portions (e.g. chops) which are to be presented in a so-called pre-pack, to all be aligned in a similar manner and either shingled (so that except for the topmost portion, those below are partly obscured by those above), or the portions are attractively arranged side by side on a flat tray, so that the size and quality of all of the portions making up the pack can be seen.

Hitherto the picking up and placing of portions into trays or other containers, has been at least in part performed manually. While this has meant that product orientation has not been called for on the conveyor, the process is labour intensive, and production limited to the speed at which the operators can pick and place the portions. The work is also tedious.

It is an object of the present invention to automate the above process.

It is another object to provide apparatus which can be employed in use to pick and place similar articles (which may be similar items of food but could be any similarly sized articles such as small manufactured items), which are to be packed for storage, and display for selling.

Existing Technology

Computer controlled robots have been developed and are available from ABB Ltd of Milton Keynes, England.

The IRB 340 and IRB 340SA robotic arms are especially suited to picking up foodstuff items such as pork or lamb chops, steaks, chicken portions, fish fillets and the like, elevating each picked up article so as to allow it to be moved laterally to another position (such as onto a parallel conveyor) where it can be lowered or dropped onto the other conveyor or onto a tray on the other conveyor.

During lifting, moving and lowering, the robot is adapted to be capable of rotating the article it has picked up, through up to 360° although for most purposes up to 180° of rotation in either direction from the position when it first engages the article, is sufficient.

To facilitate the positioning of the robot, video cameras, positioning sensors direction of movement and speed of movement transducers linked to each conveyor are provided to supply information to the controlling computer. In this way the arrival of the next article to be picked up by the robot can be flagged, its precise position across the width of the conveyor can be supplied to the computer, and if it is shaped (in plan view) or marked, so that its orientation can be visually determined, cameras viewing the articles can supply information which enables the computer to determine the precise orientation of each article and therefore determine by how much it needs to be rotated, so as to occupy a given orientation when positioned on the second conveyor (or in a tray thereon).

Where articles are stacked or shingled they can be picked and placed as one.

It is an object of the present invention to provide a tool (gripper) which can be mounted to and operated by such a robotic arm.

SUMMARY OF THE INVENTION

According to a first aspect of the present invention tooling is provided which is adapted to be secured to the movable end of a computer controlled robotic arm by which in use articles can be picked up from one position, optionally rotated in transit and lowered into a second position, which tooling comprises (a) two blades each having a leading edge and trailing edge, and both being movable between a first position in which their leading edges are separated by a large gap and a second position in which the leading edges are in contact or are separated by a smaller gap, and (b) drive means for effecting relative movement between the two blades for moving them between the first and second positions, whereby in use with the blades in the first position the tooling can be lowered so that the undersides of the two blades just make contact with a surface on which an article is resting with the two leading edges of the blades on opposite sides of the article and the latter can be picked up by the blades by operating the drive means so as to move the blades into their second position below the article.

Preferably the thickness of the blades is selected so that there is little tendency for the leading edge of either blade to push the article ahead of the blade as the leading edges engage the article, but rather to slide between the article and the surface on which the article is located.

Preferably the leading edge of each blade is bevelled or rounded so as not to present a cutting edge to the article.

Preferably the drive means acts to move the two blades at high speed between the two positions, so that there is little tendency for friction between the surface of the blades and the underside of the article to cause the latter to move laterally with either of the blades.

Preferably the blades are similar in size and shape and thickness and are made from similar material and have a similar surface finish at least on their upper faces which make sliding contact with the underside of the article as they move into their second position.

Preferably the surface finish of the undersides of the blades is also similar.

Preferably the speed of movement of each blade is similar to that of the other, albeit in a generally opposite sense.

Preferably the size and shape of the blades is selected so that the area of each blade available to slide below the article is greater than 50% of the area of the article.

Preferably the trailing edge of each blades includes an upstanding lip or ridge or wall which may engage opposite edge regions of the article when the blades occupy their second position.

Each lip, ridge or wall may be integral with the blade (as by bending up or moulding or otherwise forming the trailing edge of the blade to form a lip) or may comprise a separate member which is secured to the upper face of the blade adjacent to its trailing edge, as for example by adhesive, or welding, or rivets, or screws, and preferably spaced from the blade to facilitate cleaning.

In order to prevent unwanted rotational skewing or twisting or lateral movement of any kind, of an article relative to the blades, as the latter slide therebelow, the tooling preferably includes a movement restraining mechanism, comprising article engaging means which in use is adapted to remain stationary while the blades move relatively thereto whereby the engagement between the article engaging means and the article will resist lateral or rotational movement of the latter relative to the tooling as a result of movement of the blades relative thereto.

The article engaging means may for example engage an upper face of an article over which the tooling is lowered.

In one such arrangement the movement restraining mechanism may comprise one or more spikes which point generally perpendicularly downwardly towards the plane containing the two blades, with the or each pointed end spaced from the said plane by a distance which is less than the thickness of each article to be picked up by the tooling, so that as the tooling is lowered onto an article the spikes penetrate the article before the blades make contact with a surface on which the article rests, such as a conveyor. The engagement of the spikes and the article prevents movement of the latter as the blades subsequently slide below the article either the pick up or release it.

In order to prevent an article remaining impaled on the spike or spikes, after the blades are opened to release the article, the movement restraining device may further comprise ejector means which acts to push the article off the spike or spikes, as the blades move towards their second (open) position. The ejector means may be operated by the blade drive means (or by a linkage which is operated in response to movement of at least one of the blades).

Typically the ejector means comprises at least one pin which is withdrawn upwardly as the blades move into their first (closed) position but is moved downwardly into a protruding position as the blades move into their second (open) position, so as to push the article in a similar downward direction, off the spike or spikes.

In another arrangement the movement restraining mechanism may comprise at least one resiliently deformable member located above the plane containing the two blades, and spaced therefrom by a distance which is less than the thickness of each article to be picked up by the tooling, so that as the tooling is lowered onto an article, the underside of the deformable means engages the upper surface of the article and the member becomes deformed in order to accommodate the thickness of the article before the blades make contact with a surface on which the article rests, such as a conveyor, the resulting downward force on the article, and frictional resistance to movement between the deformable means and the article, serving to restrain the latter from moving under the influence of subsequent blade movement therebelow, either to pick up or to release the article.

The deformable means may comprise a block of resiliently deformable material, a sprung plate or block, or a dished plate of spring steel or the like, or one or more fingers of spring steel or the like, having lateral stiffness but being adapted to deflect resiliently in an upward direction, relative to the blades.

Typically the or each finger is of spring steel and is bent so as to point downwardly to engage the upper surface of the article, but which can be more or less flattened by an upward force, so as to accommodate the thickness of the article. The fingers may include two or more further bends to increase the area of the finger in contact with the article.

In a third arrangement the movement restraining mechanism comprises a vacuum chuck which is adapted to become vacuum clamped to the upper surface of the article as the tooling moves downwardly onto the article. The vacuum clamping serves to resist movement of the article as the blades subsequently slide therebelow either to pick up or release the article. The vacuum chuck is adapted to release the article therefrom, possibly using a positive pressure air pulse, as or after the blades are opened, to deposit the article at its second position.

Rotation of the article in transit between the first and second positions may be achieved by rotating one part of the robotic arm relative to another part thereof, or rotating the tooling relative to the robotic arm.

Where the rotation restraining means comprises a vacuum chuck or two or more spikes each of which positively engages in the article, rotation of an article secured thereto may be achieved by rotating the vacuum chuck or a member from which the spikes depend, in a plane which is parallel to the plane containing the two blades, so that the article is rotated relative to the blades.

Experience has shown that, where they can be used, spikes are a very reliable way of holding the product stationary as the blades are moved inwardly to form a support platform for the product, and outwardly, when the product is to be deposited at its new location. However, there are situations where spikes are not desirable and a vacuum chuck cannot be employed and sprung fingers are not entirely satisfactory.

In particular the article (product) may comprise a collection of two or more separate or only tenuously attached pieces. Here the outward movement of the blades has been found to drag the product pieces sideways and break them apart due to frictional contact between pieces and blades.

In other situations it may not be possible or desirable to pierce the product or even indent the upper surface (even if very short pins were to be used), and the alternatives of sprung fingers have not always provided sufficient frictional resistance to movement to prevent lateral dragging or separation of the pieces (in the case of sprung fingers) or the suction effect of a vacuum chuck on the upper surface of the product may itself damage the product.

It is therefore another object of the present invention to provide an improved gripper tool which may include spikes or sprung fingers but which is adapted to reduce the risk of product separation or lateral movement due to sideways withdrawal of the blades.

It is also a further object of the present invention to provide an alternative improved gripper tool which is adapted to restrain product laterally to prevent product separation or lateral movement due to sideways withdrawal of the blades, but which does not entail the use of spikes (and therefore will not penetrate the upper surface of the product) but which will still enable the product to be rotated by the tool (if required).

According therefore to a second aspect of the present invention in gripper tools such as hitherto described a support member is positioned above each of the blades, and drive means is provided for moving the support members and the blades which in use operates to move the support members and the blades until product is gripped between the support members and thereafter to move the blades below the product, the drive means maintaining the support members in the product gripping position as the blades are subsequently withdrawn from below the product to prevent frictional drag on the underside of the latter from separating or moving the product, and only operating to disengage the support members from the product after the blades have moved from below the product, thereby to allow the product to drop onto, or remain on, a support surface as the tool is raised.

The drive means for the blades and support members are typically pneumatic cylinders which may be double acting, or single acting in combination with return springs.

In order to only lightly grip the product between the support members a drive for these may include a lost motion connection in combination with a low spring rate compression spring which is compressed to the extent of the overrun and provides the lateral gripping force on the product and also ensures that the lost motion is accommodated as the drive retracts.

A preferred arrangement comprises a first double acting pneumatic cylinder adapted to move the blades and support members as a single unit and a second double acting pneumatic cylinder adapted to move the blades relative to the support members.

Other motive power drives may be employed such as electric motors and/or electromagnetic solenoids and/or hydraulic drives.

Each support member may be in sliding contact with the upper surface of the blade with which it is associated, so that the relative movement during closure on product and/or during opening to release the product, acts in a self-cleaning manner, and the support member can be thought of as scraping the upper surface of the blade, and to that end can be described as a scraper.

In so far as it is not necessary to fully retract both blades and support members in order to release product, in use the drive means may be operated to retract the blades so as to align with the inner faces of the support members and then for the drive means to retract both blades and support members in synchronism, by a distance just sufficient to release the product, so that its position relative to the support surface remains substantially undisturbed from that determined by the position to which the tool has been moved. In this way as the tool is raised vertically clear of the product the support members continue to locate the product until the tool has been raised clear thereof, after which the drive means may be operated to fully retract the support members and the blades.

The step of fully retracting the support members and blades may be effected in transit as the tool returns to pick up more product.

According to a third aspect of the present invention the spikes or sprung fingers of the tools previously described may be replaced by an array of spaced apart displaceable elongate rod-like fingers which are mounted so as to extend generally normal to the plane containing the two blades, so that in use as the tool is lowered over product with the blades retracted the lower ends of some of the fingers will engage the upper surface of the product and as a consequence will be pushed upwardly as the tool continues to move downwardly over and around the product, but other of the fingers which do not register with the product will not be pushed upwardly but will remain extended and will surround the product and in use will provide lateral support therefor as the blades subsequently move relative to the underside of the product both inwardly and outwardly.

The fingers may have pointed, but more preferably blunt, lower ends, and may be resiliently biased in a direction towards the blades or may simply be a sliding fit in guides so that if the blades are generally horizontal the fingers will be generally vertical and will drop under their own weight due to gravity.

Preferably stop means is provided to prevent the fingers from dropping to the level of the blades so that engagement of blades and fingers is prevented.

When product held by the tool is to be placed, the blades are first retracted to allow the product to drop from the tool or to pass therebetween as the tool is raised, and those fingers which had been elevated by the product fall back into line with the other fingers as the product and tool separate.

Where product can become attached to the fingers and can infiltrate gaps between the latter and guides or sleeves or openings in a plate through which the fingers extend, additional drive means may be provided to positively push all the fingers in a downward manner after product has been released from the tool. This may simply comprise a flat plate or pad mounted above the fingers which is supported by the upper ends of the fingers and can lift freely as fingers are forced up by product therebelow, and which bears down on the fingers due to its own weight so as to force all the fingers which have been pushed up by product, to drop down into line with the fingers which were not pushed up by product, as the tool and product separate.

Alternatively the plate or pad may be positively driven in a downward sense for example by a pneumatic cylinder or electric motor or solenoid drive.

Alternatively each of the fingers may comprise the piston of a pneumatic cylinder, and air pressure in the cylinders forces all the fingers in a downward sense, but possibly with the aid of a relief valve air is allowed to be released so as to maintain a constant pressure as fingers are pushed upwardly into their cylinders as their lower ends engage product.

Where the robotic arm itself is not torsionally stiff, or the connection between the arm and the tooling, or the arm and a fixed support, allows relative rotational movement to occur due to wear, inherent lost motion or lack of torsional stiffness in the or each connection, any force exerted on the blades and/or support members during pick-up, or any reaction torque transmitted to the arm as the blades are opened, may cause the tooling to rotate through a small angle at a crucial point in the pick and place cycle.

This is especially of concern when the blades and/or support members (if provided) are opening to release the article, since backlash in the arm and connections and/or inherent flexibility in the torsional axis of the robotic arm, can result in the article being incorrectly orientated by the arm and tooling when it is released, if the opening of the blades and/or support members (if provided) generates a reaction torque on the torsion drive axis of the robotic arm.

Therefore according to a particularly preferred feature of the invention, the mechanism by which the two blades and/or support members (if provided) are caused to move is selected so as to exert negligible (preferably zero) torque about the torsion drive axis of the robotic arm and/or about the rotational axis between the arm and the tooling and/or about any axis about which one part of the arm can rotate relative to another part thereof.

Preferably the tooling includes a bridge which is adapted to be attached centrally to the robotic arm, to which the two blades are pivotally mounted at opposite ends, and to which is also connected the drive means by which the blades are moved between their first and second positions, and the support members and their drive means (if provided).

Preferably the bridge is of aluminium or plastics as are any struts or mountings for attaching the blades to the bridge or drive, so as to keep the weight of the tooling to the minimum.

Each plate and (if provided) each support member may be made from plastics but is preferably made from stainless steel, and typically is of the order of 0.5 mm thick.

Preferably an elongate Nylon® block is secured along but spaced from the trailing edge of each blade.

The drive means may be such as acts equally and oppositely on the two blades and supports (if provided) or may be such as to act on one of the blades and one of the supports (if the latter are provided) with a connection between the two blades and between the two support members to transmit drive to the other blade (and to the support member (if provided)), so as to cause each to move in an appropriate manner relative to the driven blade (and driven support member if provided).

The drive means may be double acting in the sense that it exerts a positive driving force on the or each blade and the or each support member if provided, in both directions of movement.

Alternatively the drive means may act only to move the blades (and support members (if provided)) in one sense, and spring means acts to move them back in the opposite sense once the drive means is de-energised or disengaged.

Where the robotic arm includes a rotational drive, for rotating tooling attached thereto relative to the arm, this may be employed for orientating the tooling and therefore an article therein, during transit.

Alternatively the robotic arm rotational drive may be employed to mechanically actuate drive means on the tooling for effecting relative movement of the blades and of the support members (if provided).

Where the tooling includes a bridge as aforesaid and the blades are pivotable relative to the bridge, the drive means may be attached in part to the bridge to move the blades relative to the bridge and thereby relative to one another. Likewise the drive means may act in a similar manner on support members if provided.

Where just prior to their inward sliding movement below an article, the blades are to be pressed into contact with a flat article/product supporting surface, such as the upper surface of a smooth conveyor belt on which the article is carried, a resilient lost motion connection may be provided between the blades and the robotic arm. This permits the blades to make contact with the article supporting surface shortly before the downward movement of the end of the robotic arm carrying the tooling is stopped, and for the final movement of the robotic arm to compress the resilient lost motion connection after the blades make contact with the said surface. The energy stored in the compression of the resilient lost motion connection exerts a downward force on the blades (which is resisted by the said surface, e.g. the conveyor) which ensures that the blades remain in sliding contact with the surface and do not lift as they move towards and engage the article, but instead continue to push under the article and lift it, to enable the blades to close.

The lost motion connection may be between the robotic arm and the tooling or where the tooling includes a rigid bridge, may be between the blades and the bridge.

Where the blade drive means is attached in part to the bridge, preferably a lost motion connection is provided between the drive means and the bridge or between the drive means and the blade (or blades), to accommodate any lost motion between the bridge and the blades. Alternatively the drive means may be torsionally stiff in a plane parallel to that in which the blades move but capable of flexing or distorting or rising and falling as by pivoting in a plane which is perpendicular to the plane in which the blades move, so as to accommodate the lost motion between the blades and the bridge.

Where support members are provided above the blades, any lost motion of the blades relative to the robotic arm or bridge must also be replicated for the support members, to allow the latter to move with the blades after they make contact with the conveyor.

The drive means for moving the blades and/or the support members where provided, may be electrically powered, and may comprise a solenoid or rotational electromagnetic drive, but is preferably pneumatically powered and comprises a pneumatically extensible strut, preferably a double acting strut and movement of the piston in the cylinder of the strut is achieved by applying positive pressure to one end or the other of the cylinder, as required.

Air under pressure is preferably supplied to a valve carried by the arm or the tooling, preferably on a bridge of the latter, and the valve is either solenoid operated to direct the air pressure to one end or the other of the strut, or is pneumatically operated by second air-line means from the, or another source of air under pressure, under the control of a computer which may be that which controls the robotic arm.

The blades and where provided the support members may rotate relative to one another and/or to a bridge forming part of the tooling, or may slide linearly relative to each other or to the bridge.

Where the blades and (if provided) the support members are carried below a bridge, the gap between the bridge and the blades may be adjustable to allow different heights of article to be accommodated within the tooling.

The invention is not limited to picking up single articles, and by appropriately dimensioning the blades and their travel and the gap between the blades and any supporting bridge, a stack of two or more articles arranged one above the other (such as a stack of bacon slices) may be picked up by the tooling. The height of any support members provided in combination with the blades is also preferably selected according to the height of the article or articles in the stack.

Likewise if two or more portions of meat such as chops or steaks or fish fillets have been arranged into a shingled array on the conveyor, tooling constructed and operated in accordance with the invention may be employed to pick and place the shingled array, without disturbing the relationship of portions making up the array.

Preferably the tooling is orientated relative to a shingled array so that the two blades (and if provided the support members) advance towards the array along a line which is generally orthogonal to the direction in which the portions are shingled.

Preferably therefore the tooling is constructed with a viewing system which provides image signals to the robotic arm controlling computer, which enables the latter to determine the orientation of each article and in particular the shingling direction of a shingled array, and to generate control signals for rotating the tooling accordingly to ensure that before the tooling engages an article, such as a shingled array, its orientation relative to the article or array is such that the blades (and if provided the support members) will move appropriately relative to the article or array.

Accordingly any reference to article herein can mean a single item or a stack or shingled array of two or more such items.

The invention also lies in a product handling system comprising a first conveyor, a second conveyor spaced from the first, a robotic arm and computer control therefor, having tooling attached to its remote and movable end constructed as aforesaid, both arm and tooling being controllable by signals from the computer to position the tooling around an article on one conveyor and if provided move the support members into opposed contact with an article and to slide the blades thereof below the article, and thereafter lift the article from the one conveyor by appropriately controlling the robotic arm, and moving the arm and therefore the article containing tooling so as to position it over the other conveyor and by appropriate control signals from the computer, to open the blades and the support members (if provided) and deposit the article on the other conveyor.

The arm may be moved under computer control in a downward sense after the tooling has been positioned over the said other conveyor before the blades (and support members (if provided)) are opened, thereby to control the distance through which the article has to drop onto the other conveyor on being released.

The system may include cameras and sensors which produce signals by which the computer can determine the position and/or orientation and/or nature of each article on the said one conveyor, and can generate control signals to cause drives to operate to lift and/or rotate and/or lower the tooling and/or adjust the robotic arm so that the tooling is positioned at just the right time relative to an article travelling on the one conveyor to enable the tooling to pick it up therefrom and if required to rotate it in transit and position it on the other conveyor at precisely the right point in time and in the correct orientation.

The said other conveyor may have trays or other containers thereon, and the viewing system and sensors may be set up so as to identify the precise position of each tray or container relative to the robotic arm, and the computer may be programmed to control the movement of the said other conveyor as well as the said one conveyor, to ensure that a specific tray or container is at a specific position at a specific time to allow a specific article picked from the one conveyor to be placed in the said tray or container by tooling operating and constructed as aforesaid and carried by the robotic arm.

The invention will now be described by way of example with reference to the accompanying drawings in which:—

Figure 2:
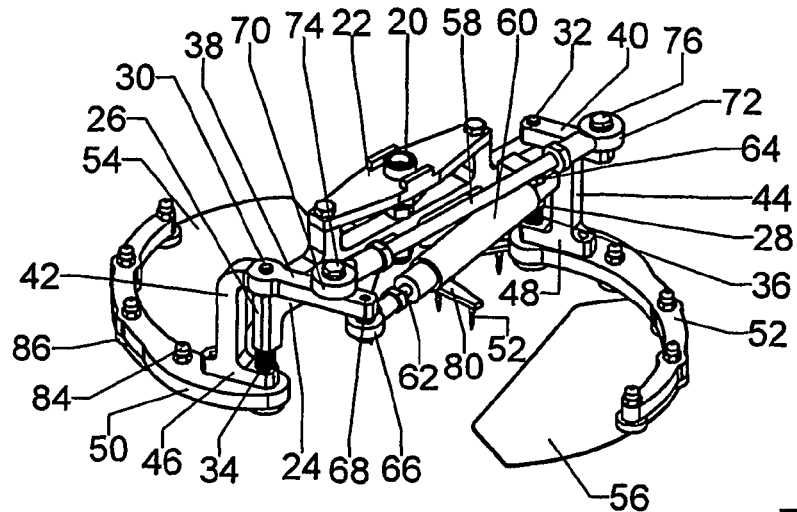
Figure 3:
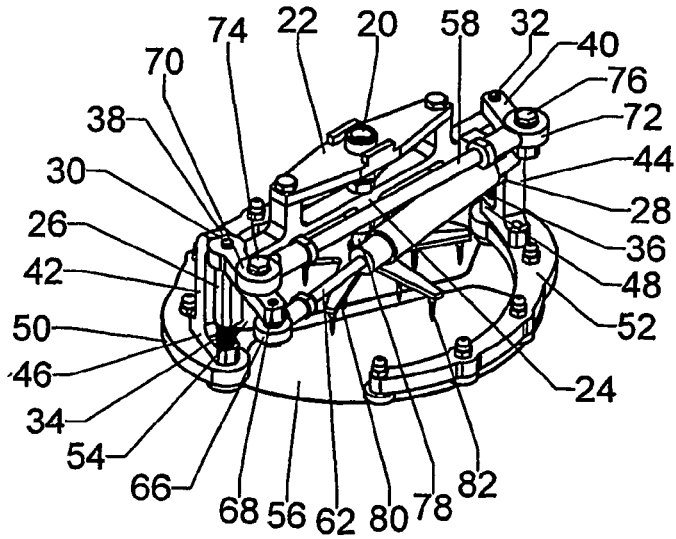
Figure 4:
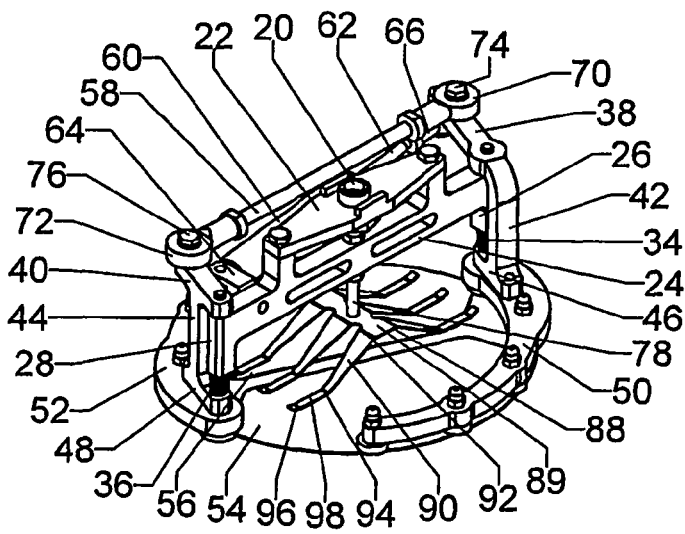
Figure 5A:
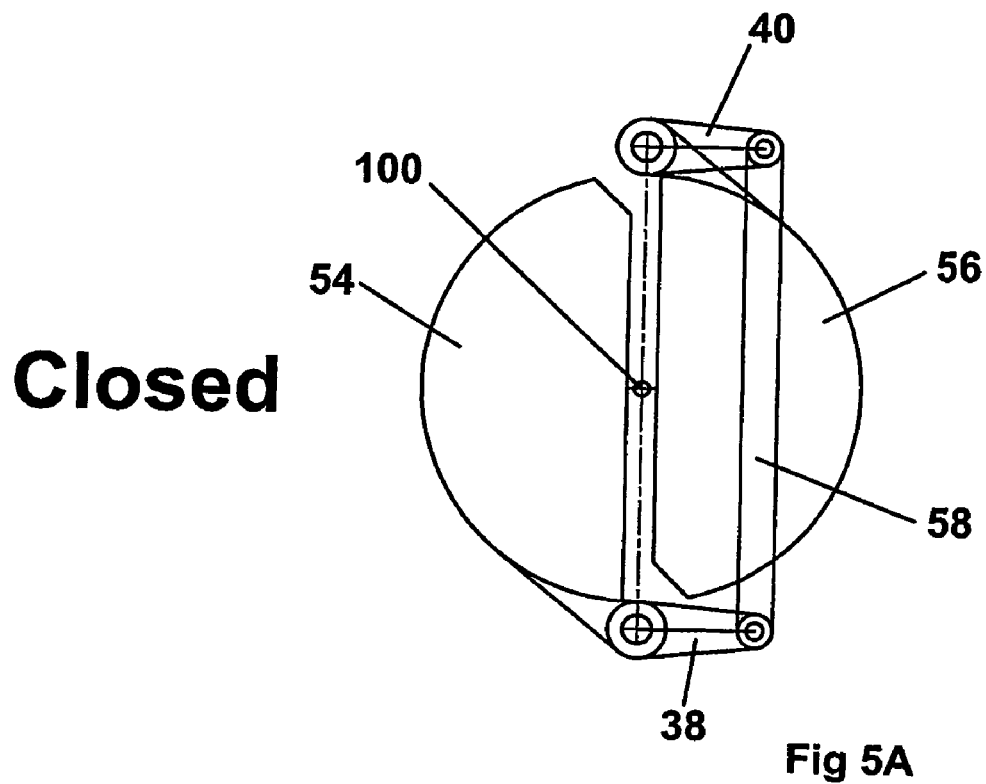
Figure 5B:
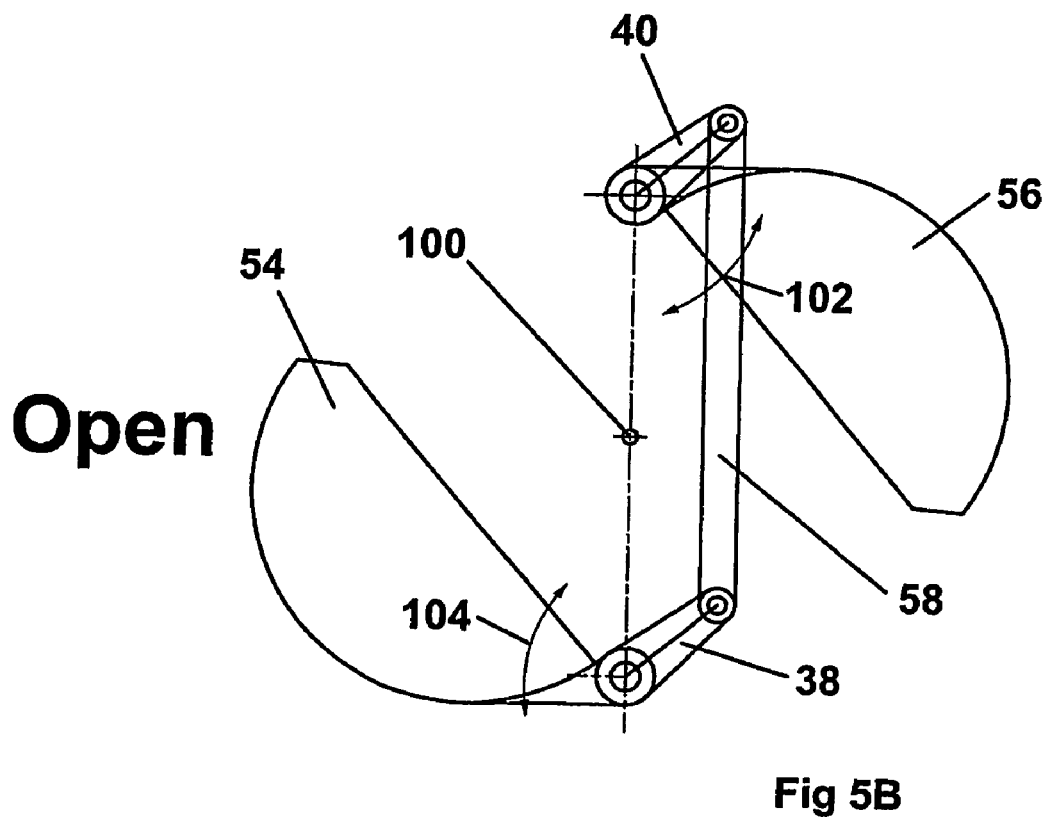
Figure 9A:
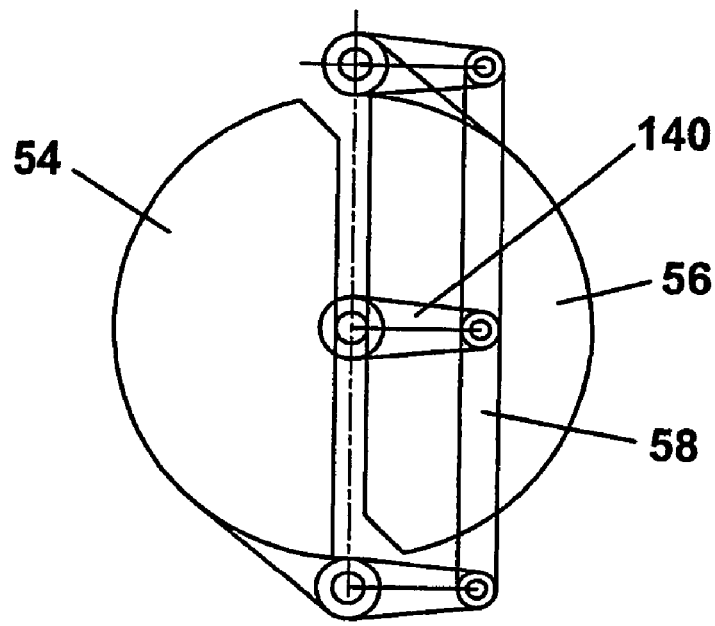
Figure 9B:
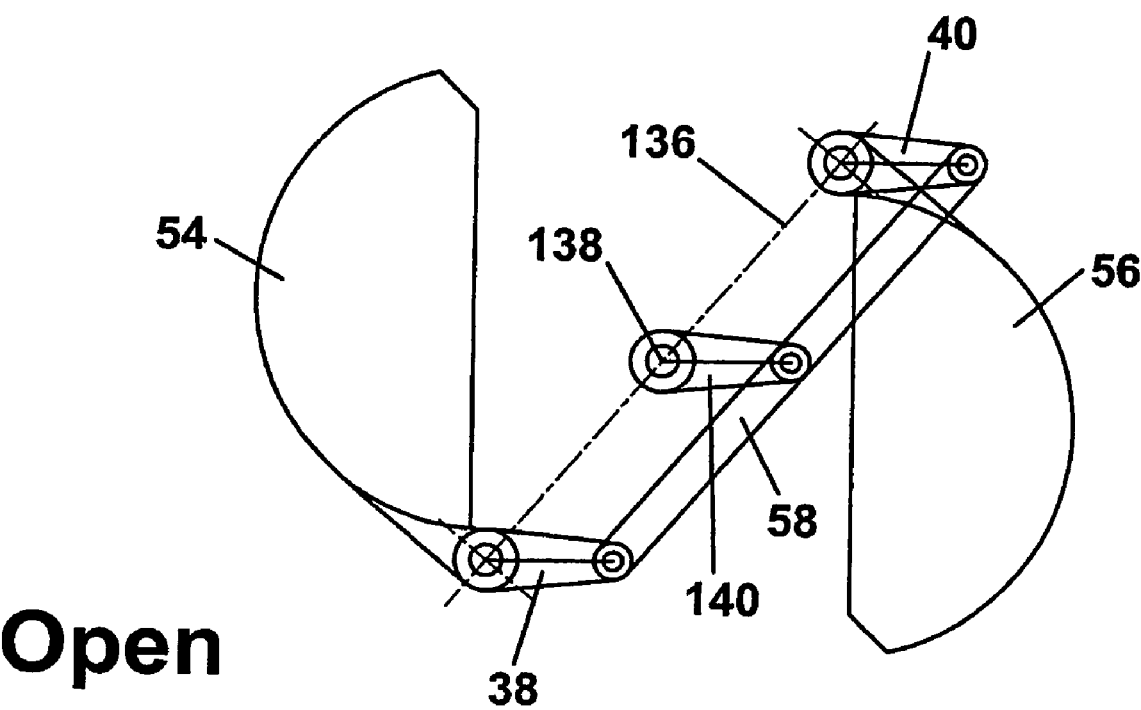
Figure 10A:
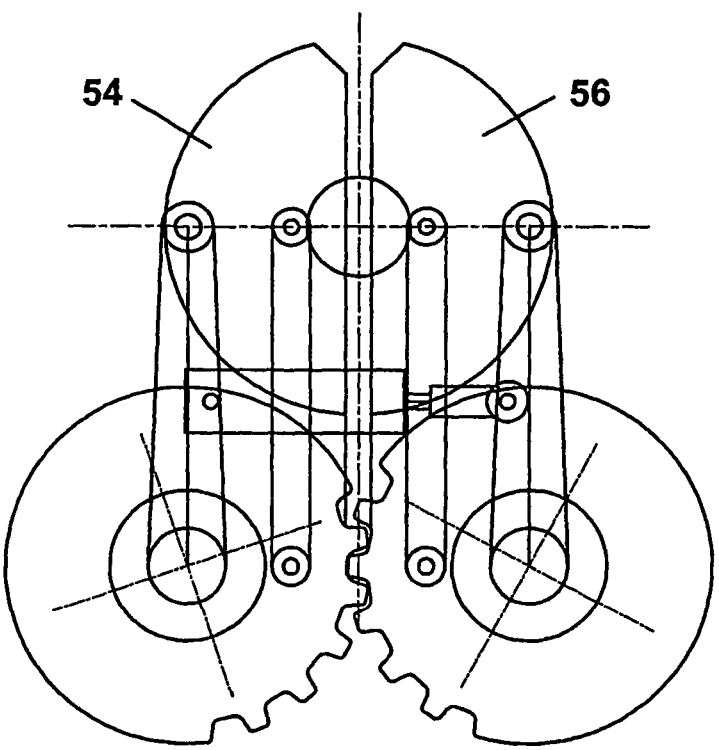
Figure 10B:
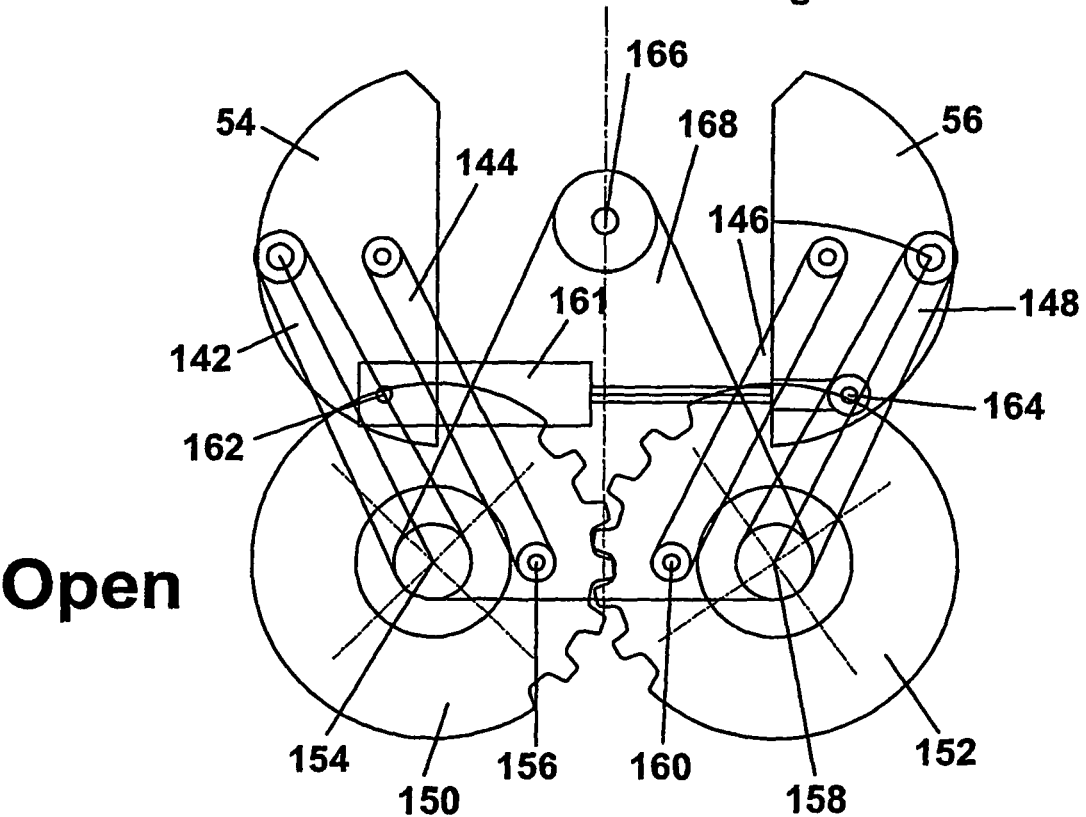
Figure 11:
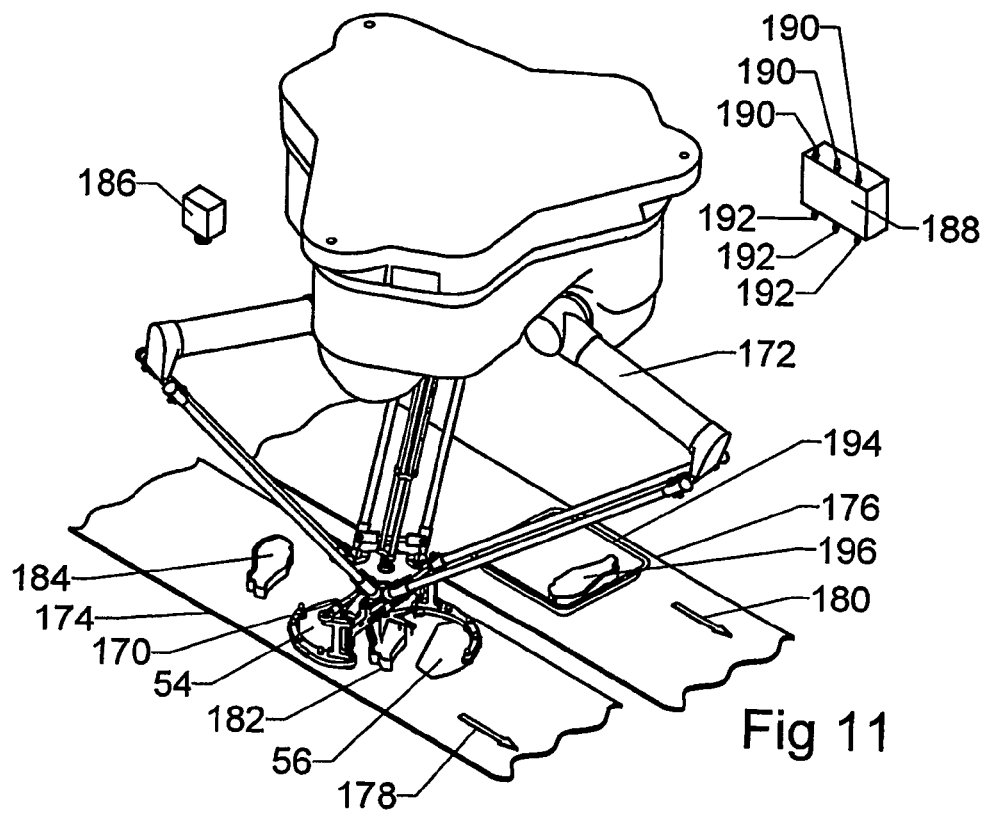
Figure 12:
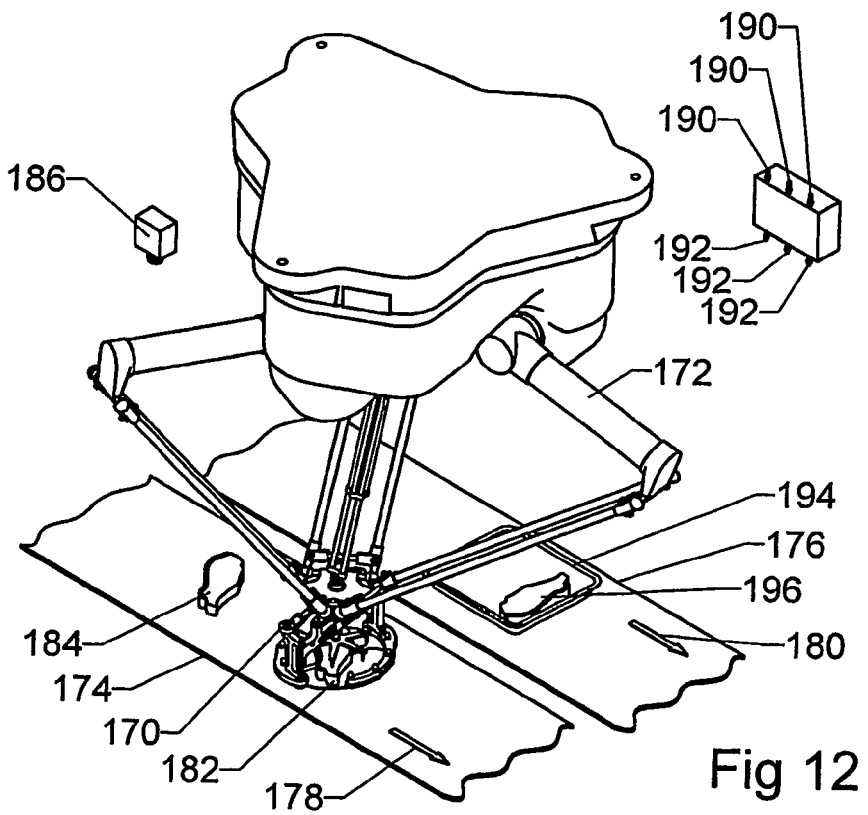
Figure 13:
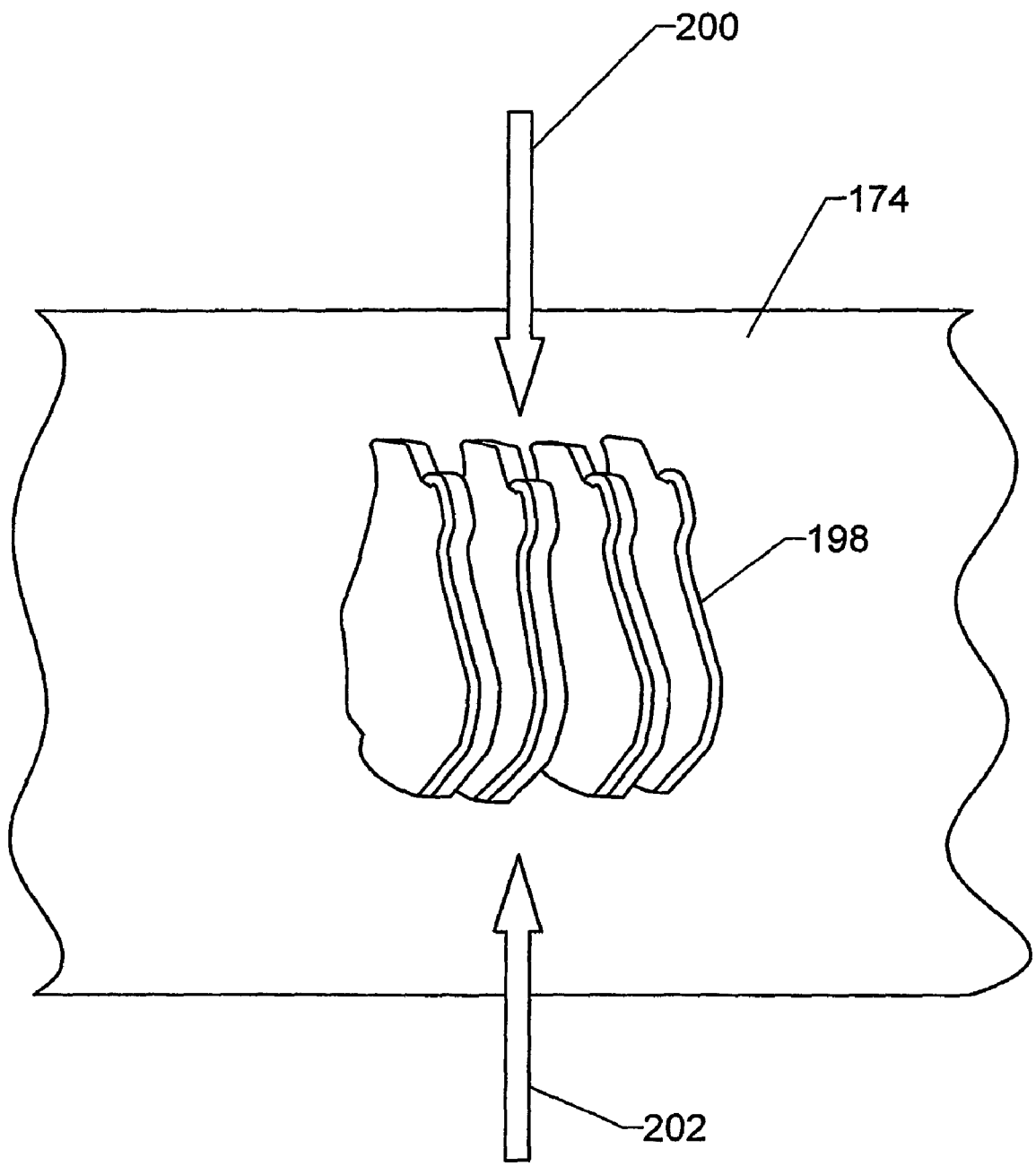
Figure 14A:
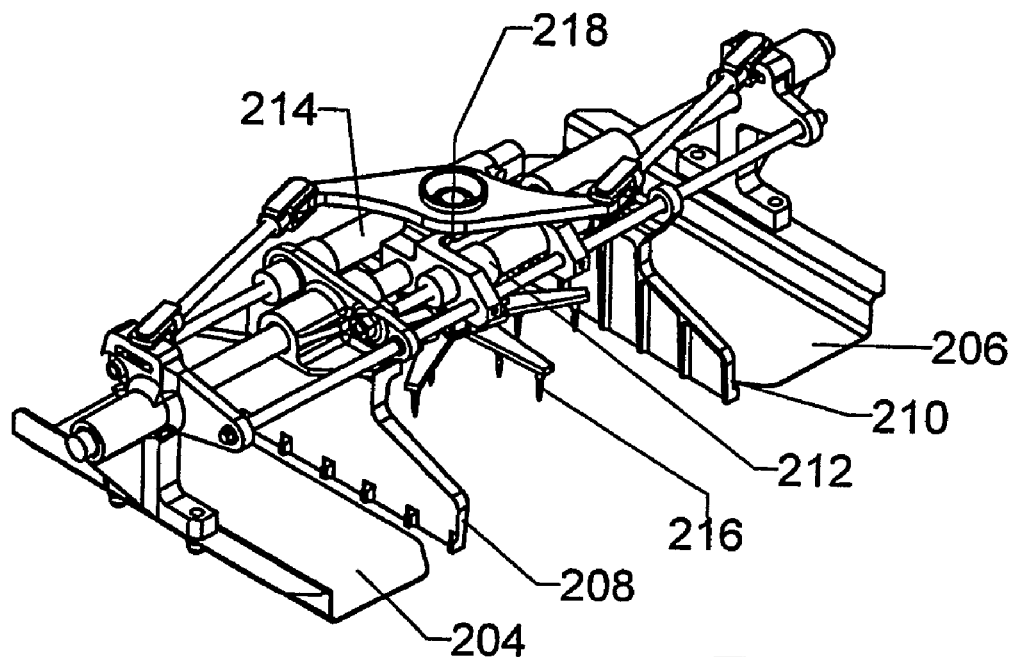
Figure 14B:
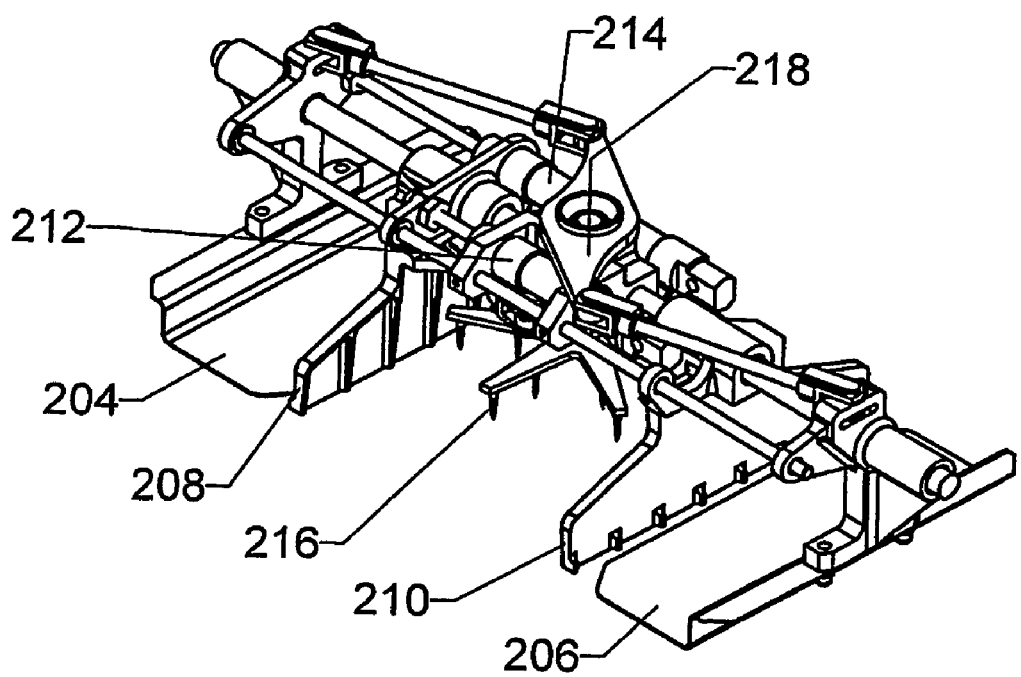
Figure 14C:
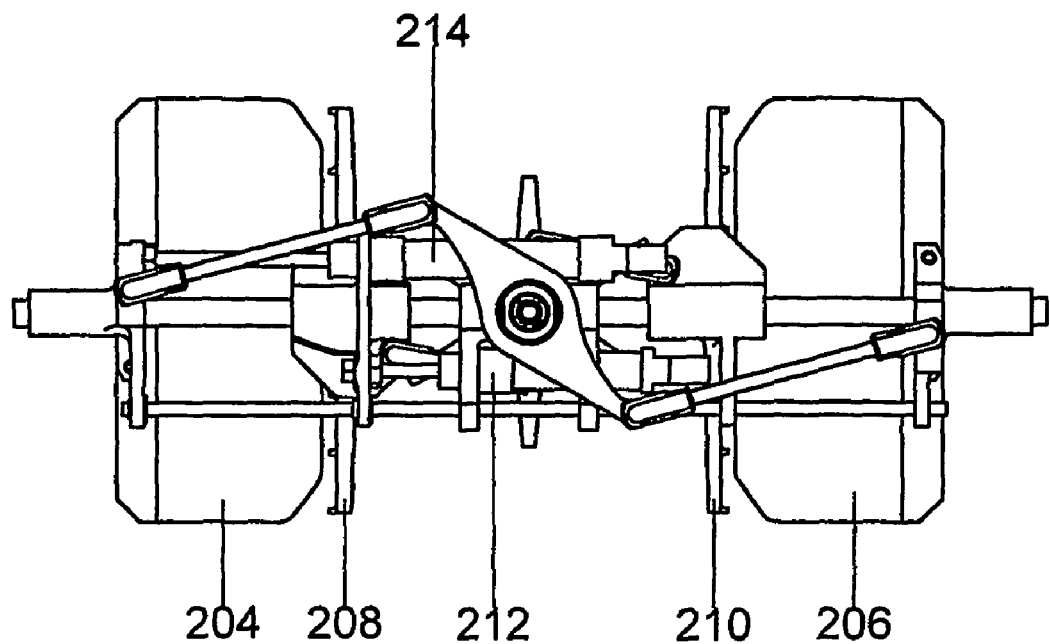
Figure 14D:
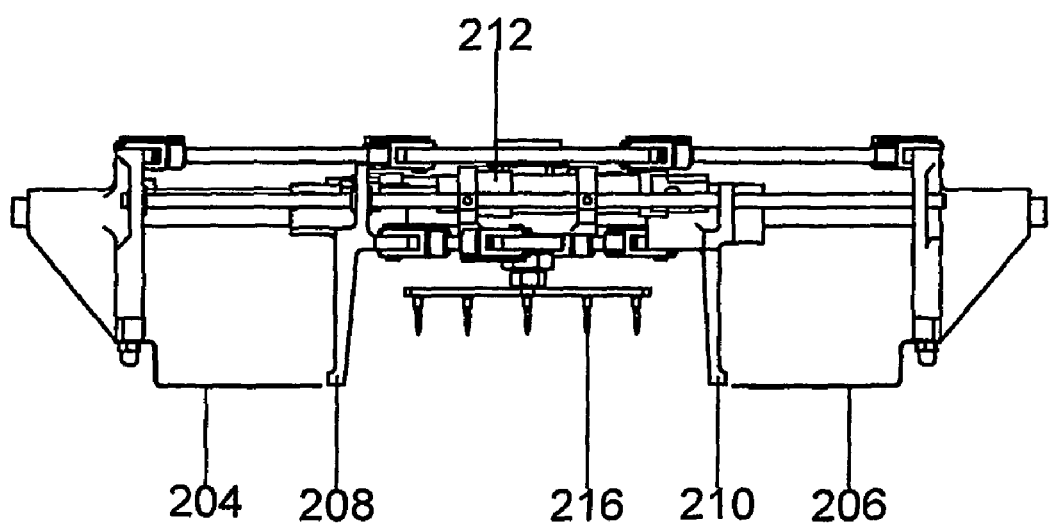
Figure 15A:
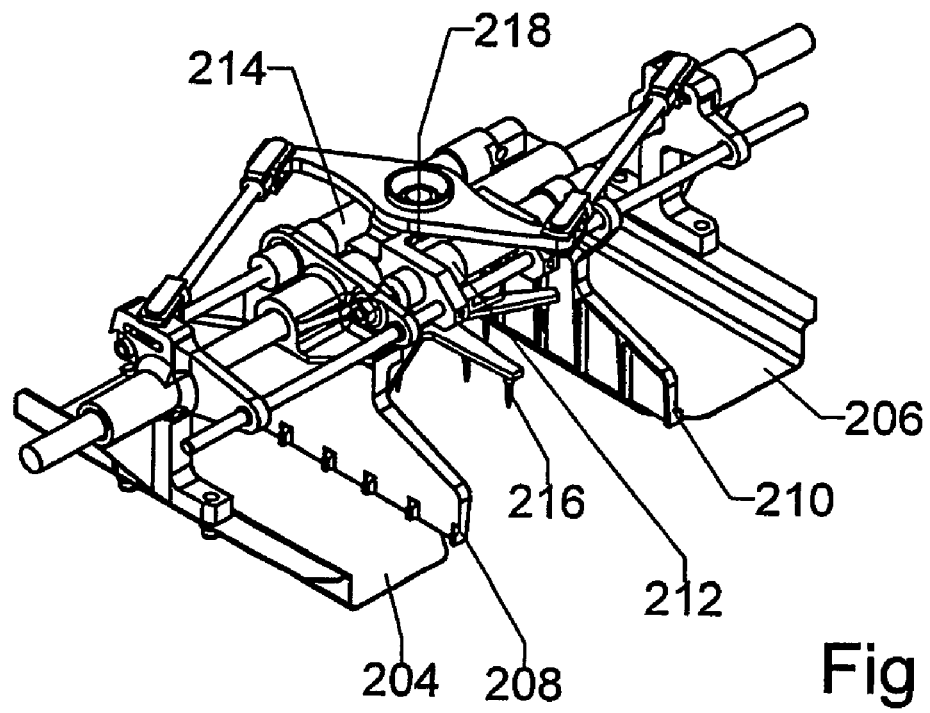
Figure 15B:
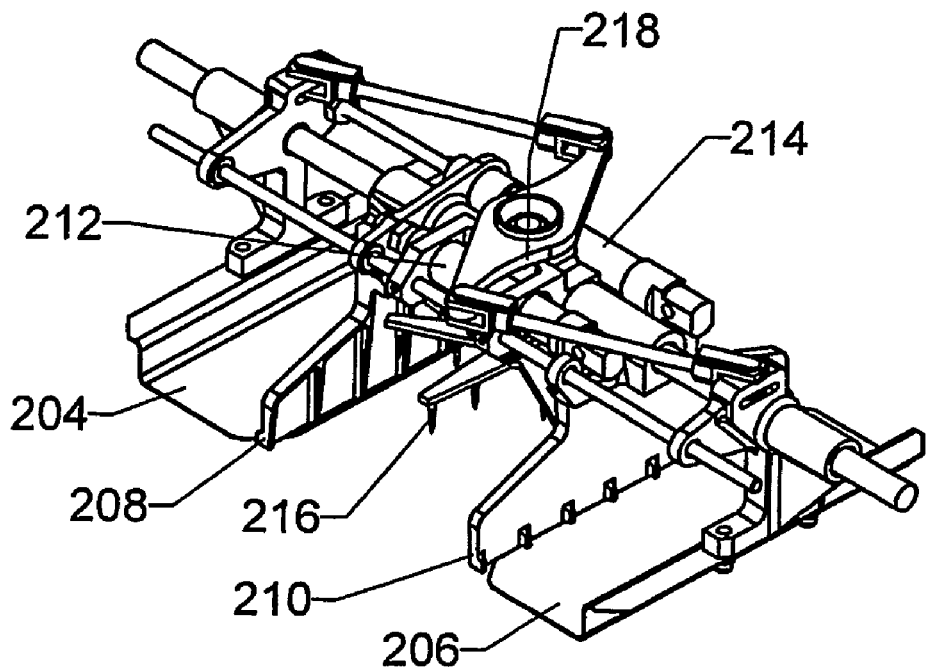
Figure 15C:
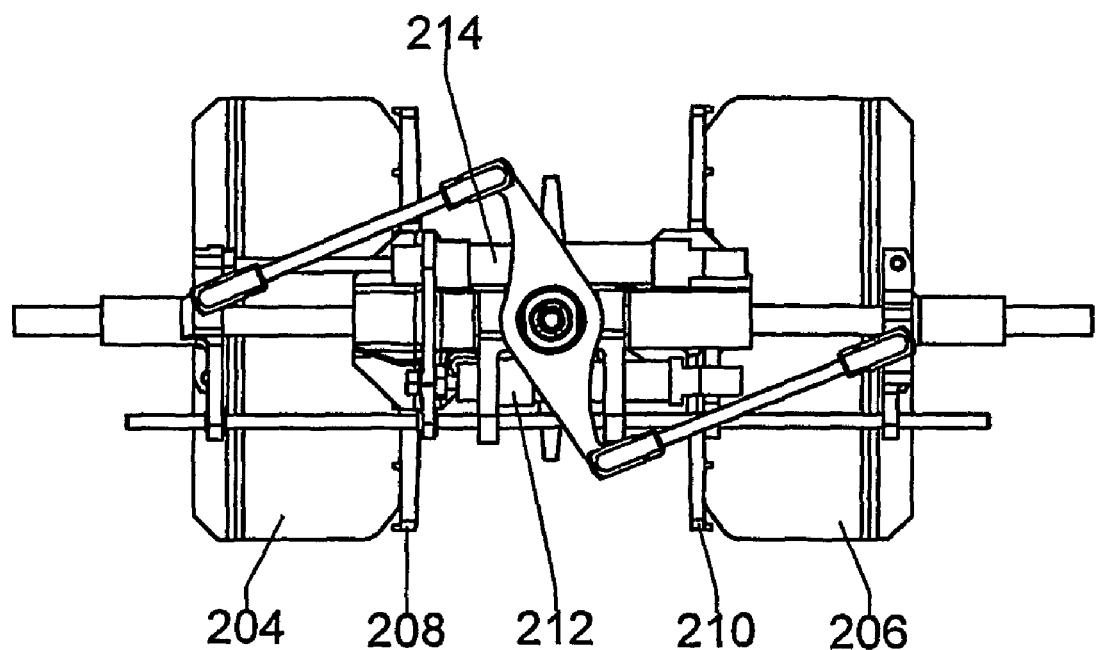
Figure 15D:
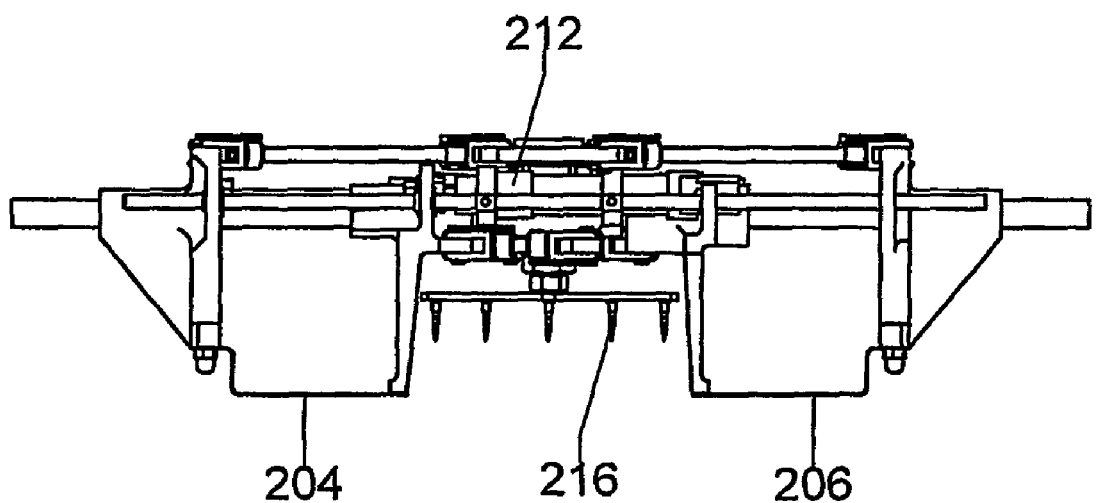
Figure 16A:
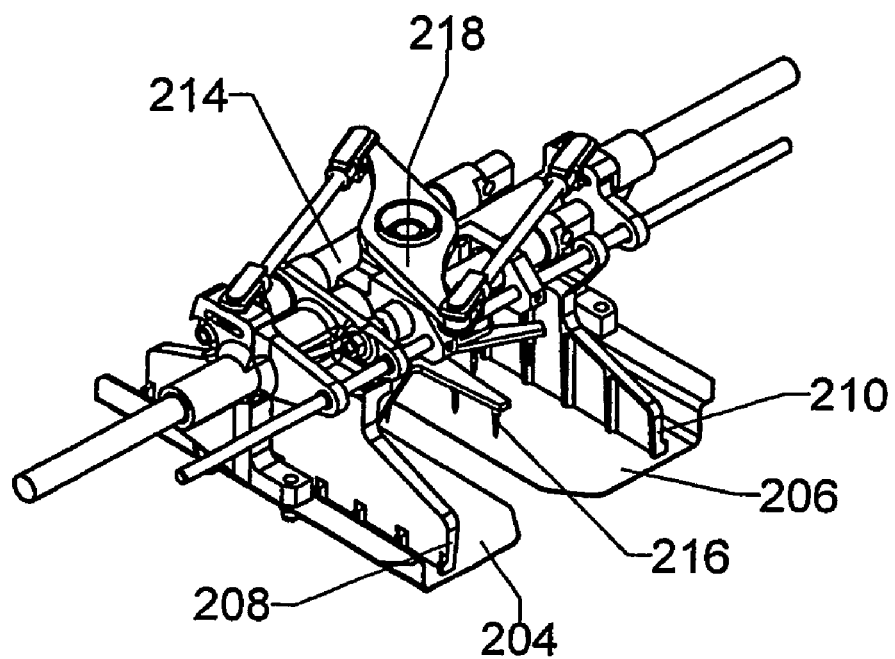
Figure 16B:
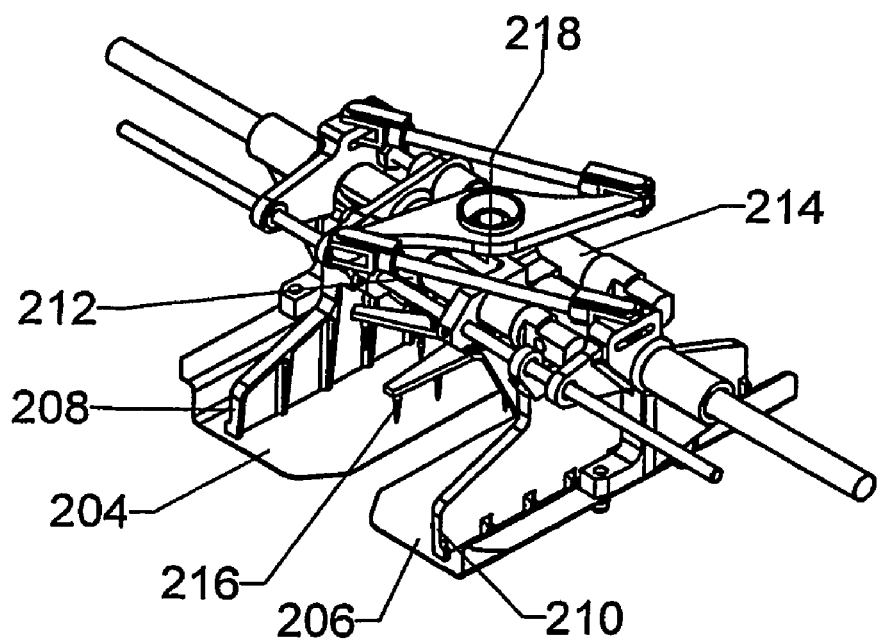
Figure 16C:
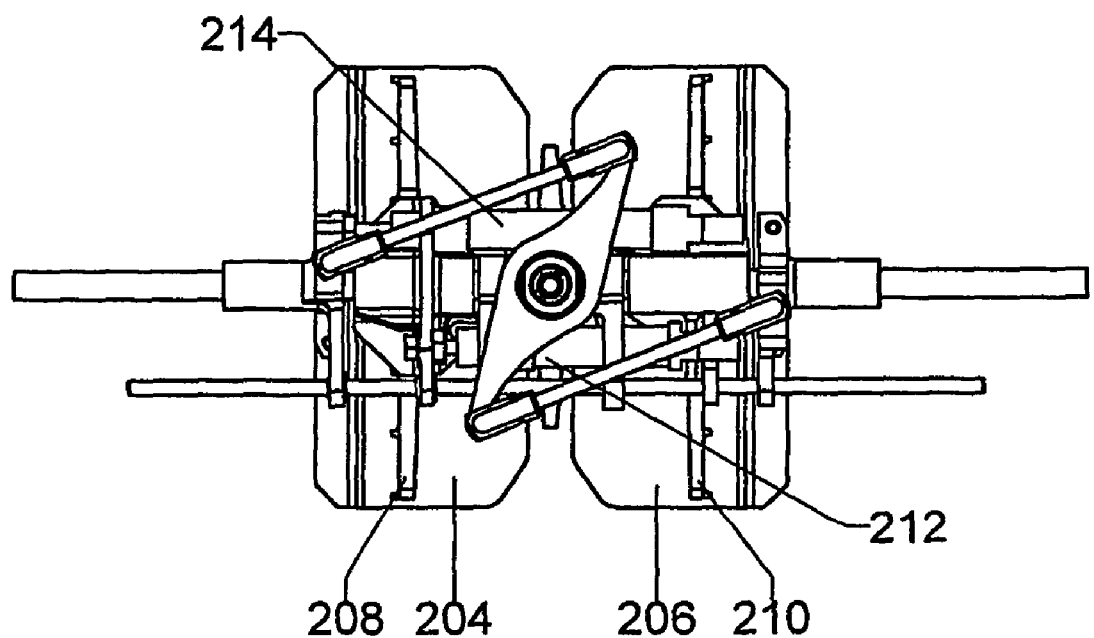
Figure 16D:
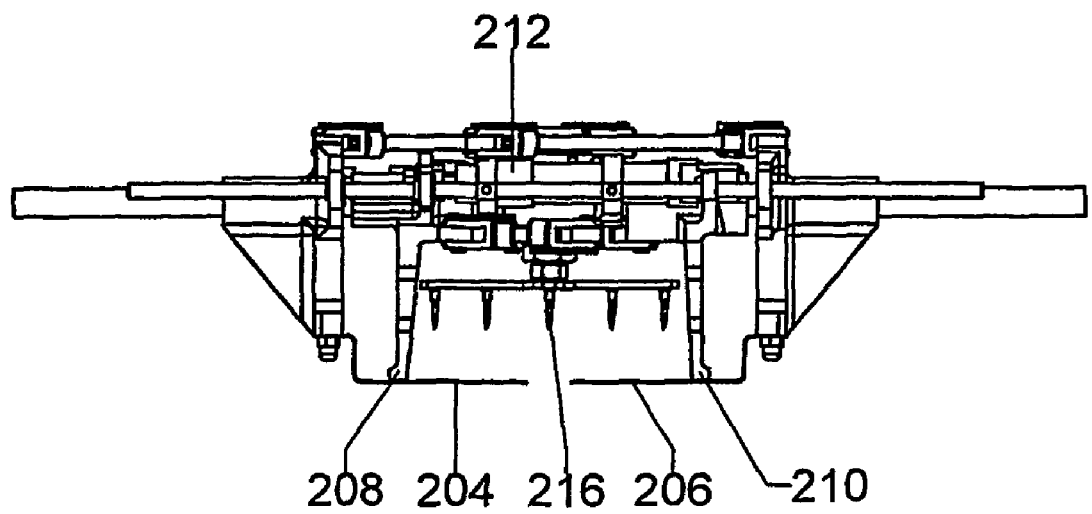

FIG. 1 is a perspective view of an ABB Ltd IRB 340 robotic arm to the lower end of which tooling embodying the invention is to be fitted, FIG. 2 is a perspective view of tooling constructed as one embodiment of the invention, in which the two blades are shown separated so that the tooling can be lowered over an article to be picked up and moved to a second location, FIG. 3 is a similar view to that of FIG. 2 but in which the two blades have been moved together, FIG. 4 is a similar view to that of FIG. 3 of a modified tooling in which the upper surface of an article to be picked up is engaged by an array of sprung fingers instead of the spikes of FIGS. 2 and 3, FIG. 5 shows diagrammatically how the two blades are moved synchronously, and shows how a resultant toque will be experienced about the axis of the connection between the tooling and the robotic arm of FIG. 1, FIG. 6-10 show different arrangements of the tooling in which the movement of the blades is such as to generate less or negligible torque on the robotic arm connection, FIG. 11 shows the tooling lowered into contact with a conveyor with the blades open but just about to move inwardly and below a pork chop, FIG. 12 shows the tooling after the blades have been moved below the chop, ready to be lifted and moved laterally by the robotic arm and dropped into a tray on an adjoining conveyor, and FIG. 13 illustrates a shingled group of chops on the one conveyor and shows the direction from which the two blades must travel to engage the shingled group to allow them to be picked up as a single article.

Figure 17A:
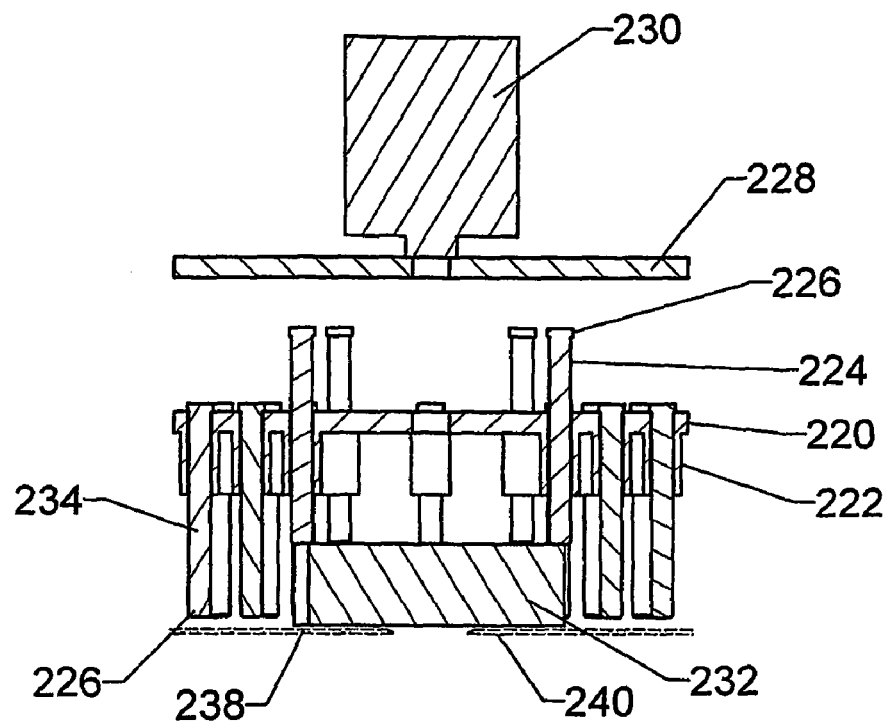
Figure 17B:
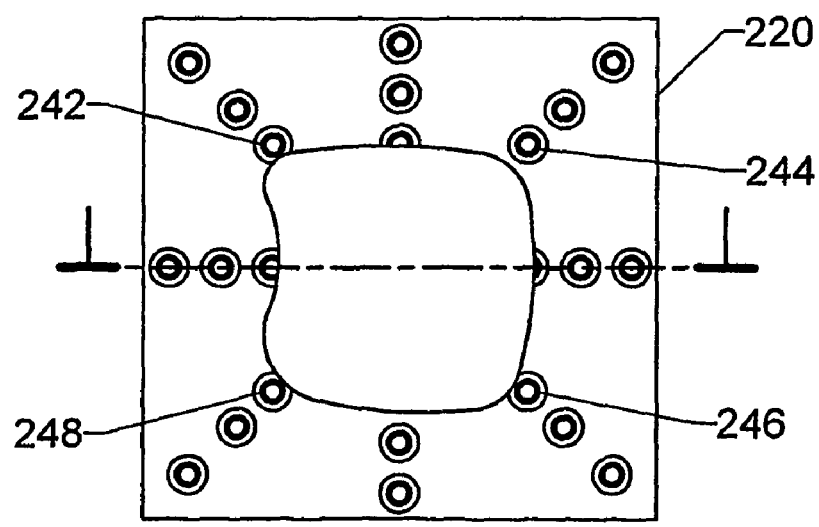

FIGS. 14A-14D are perspective, top-plan and side elevation views of a gripper tool embodying the first aspect of the invention, FIGS. 15A-15D are similar views in which one of the cylinders has been operated to move both blades and support members closer together, as a first step to engaging product (not shown, FIGS. 16A-16D are similar views in which both cylinders have been operated so that the blades have moved relative to the support members, to form a platform below product, and FIGS. 17A and 17B are side elevation and underside plan views of a multiple pin/finger locating device for use in a gripper such as shown in FIGS. 1 and 2 in place of the spikes 82.

In the drawings:

FIG. 1 is a perspective view of a robotic arm comprising an upper drive unit 10, three articulating arms 12, 14, 16 converging to a mounting device 18. The unit 10 is adapted to be secured to a framework typically to locate the arm over a conveyor (not shown in FIG. 1).

FIGS. 2 and 3 show tooling which can be secured to the mounting device 18 using a central clamping collar 20. The latter is situated midway of an upper section 22 of a bridge, the main part of which 24 extends parallel and below the upper section, to protrude beyond its ends and provide two pivot mountings 26, 28 in which two pins (not visible) are rotatably and slidingly received. The main part of each pin is hidden from view but an enlarged head can be seen at 30 and 32 and the lower end of each pin protrudes below 26 and 28 respectively and is surrounded by a compression spring 34, 36.

Trapped between each head 30, 32 and the upper end of each mounting 26, 28 is an arm, shown at 38 and 40 respectively, which extends laterally from two struts 42, 44, which have similar laterally extending parallel arms 46, 48.

The arms 38 and 46 and 40, 48 have aligned bores through which the two pins pass, trapping the springs 34, 36 between the lower ends of the mountings 26, 28 and the lower arms 46, 48. Although not shown the pins protrude through the arms 46, 48 and are keyed to the two curved supports 50, 52 for two blades 54, 56.

The upper arms 38, 40 are also keyed to the pins, so that pivoting of 38 and 40 about the pin axes causes lateral movement of the blades 54, 56 towards or away from each other.

The arms 38, 40 are joined by a link 58, pivotally joined at opposite ends to the arms 38, 40 so that pivotal movement of one arm is transmitted faithfully to the other.

Drive is provided by a pneumatic cylinder 60 and piston rod 62. In FIG. 2 the piston is shown fully retracted. The remote ends of the cylinder and piston are pivotally joined to a block 64 secured to the main part of the bridge 24 and to the arm 38 respectively.

In this way extending the piston rod by supplying air to the rear of the piston, the arm 38 is pivoted relative to the bridge 24, and the arm 40 is rotated through the same angle by the link 58. The end of the piston rod 62 is shown fitted to a block 66 which is pivotally joined by a pin 68 to the outboard end of arm 38—beyond the point at which the link 58 is pivotally secured thereto.

As with the piston and cylinder, the link terminates in two blocks 70, 72 which are held captive by and are pivotable about pins 74, 76.

Centrally of the bridge member 24 is a rod 78 which at its upper end is secured to 24 and at its lower end is secured to a star shaped plate 80 having spikes such as 82 secured to the star fingers to protrude downwardly towards the plane containing the two plates 54, 56. The spikes are adapted to engage in an article which is to be lifted by the blades, as the assembly is lowered around the article, with the blades in their open position (as shown in FIG. 1). If the plate 80 is non-rotatable relative to the bridge member 24, the action of impaling the article (not shown) on the spikes reduces any tendency for the article to be pushed or rotated by the leading edges of the blades as they close from the position shown in FIG. 1 to that shown in FIG. 2, and in so doing to slide below the article to capture it thereon.

The blades 54, 56 are shown secured to the arms 50, 52 by means of bolts and nuts (one of the latter being designated 84) and spacers (one of which is designated by reference numeral 86), are sandwiched between the arms 50, 52 and the blades 54, 56, each bolt extending through a spacer.

The heads of the bolts (not shown) are secured to the blades so as not to protrude below the underside surface of the blades, for example by welding or brazing, and the thickness of each bolt head is conveniently accommodated within an indent (not shown) in the underside of each spacer.

Since the plates do not extend to below the ends of the arms joined to the pins held captive in the mounts 42, 44 an enlargement equal in thickness to that of each of the spacers 86 plus the blade 54 (or 56) is located below the inboard end of each arm 50, 52. It may for example be an enlarged head at the lower end of each of the pins.

The springs 34, 36 allow the arms 50, 52 and the supporting parts 42, 44 and link 58 to rise relative to the bridge members 22, 24.

The lost motion allows the blades to be pushed down into contact with the surface of a conveyor, if required, whereby the springs are compressed to accommodate the relative movement of the parts.

As soon as the assembly is once again lifted clear of the conveyor, the springs will extend so as to force arms 38, 40 into contact with the upper ends of the mounts 26, 28.

FIG. 4 which shows tooling similar to that of FIGS. 2 and 3, but from the other side, shows an alternative to the star plate 80 and spikes 82 of FIGS. 2 and 3. Here the plate 80 is replaced by a spring steel plate 88 which is cut away on either side of a central section 89 to define six spring fingers, three on each side, one of which is denoted by reference numeral 90. Each of the fingers is bent as at 92, so as to extend downwardly from the central section 89, and at 94 and 96 to form article engaging pads 98.

The frictional force between the undersides of the pads 98 and an article (not shown) serves the same purpose as the engagement of the spikes 92 in an article (in relation to FIGS. 2 and 3) but without damaging the article.

FIG. 5 shows the principle behind the geometry of the arrangement shown in FIGS. 2-4. Thus the plates are denoted by 54, 56 and the link by 58. The arms 38 and 40 are denoted diagrammatically. The central axis of the collar 20 is marked at 100 and the direction of rotation of the blades is denoted by arrows 102, 104.

Since both blades rotate in the same sense about 100 (whether opening or closing) there will be a resultant torque about axis 100. If the robotic arm and/or the connection between the arm and the bridge assembly 22, 24 contains any lost motion (which will appear as overrun or backlash), this torque will result in unpredictable rotational movement of the assembly and especially the blades 54, 56 relative to their expected orientation. This may result in the article being incorrectly positioned by the tooling when deposited at its new location.

To this end FIGS. 6-10 illustrate diagrammatically alternative drive mechanisms by which the blades move in an opposite sense as they open and/or close, so as not to create any twisting torque about 100.

In each of FIGS. 6-10 the axis 100 is shown as are the two blades 54, 56.

Figure 6A:
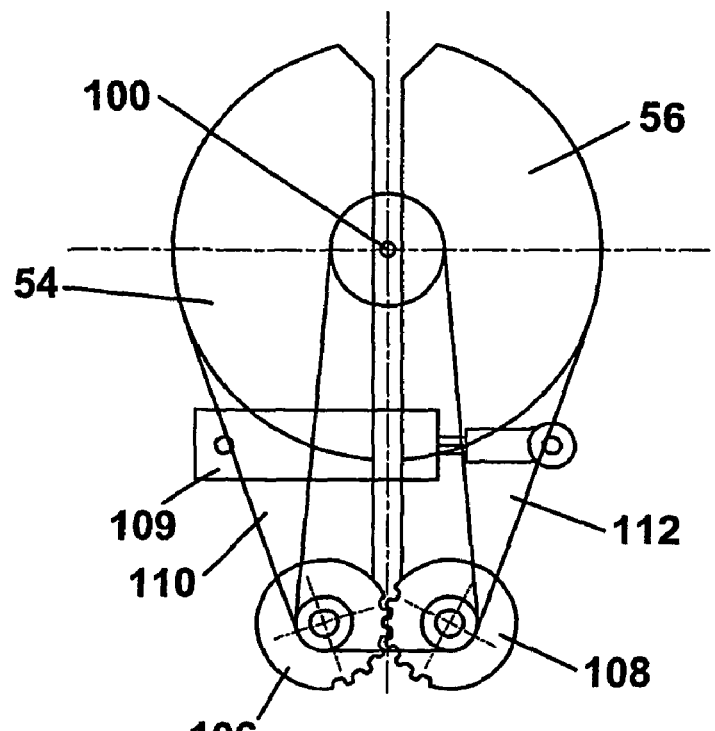
Figure 6B:
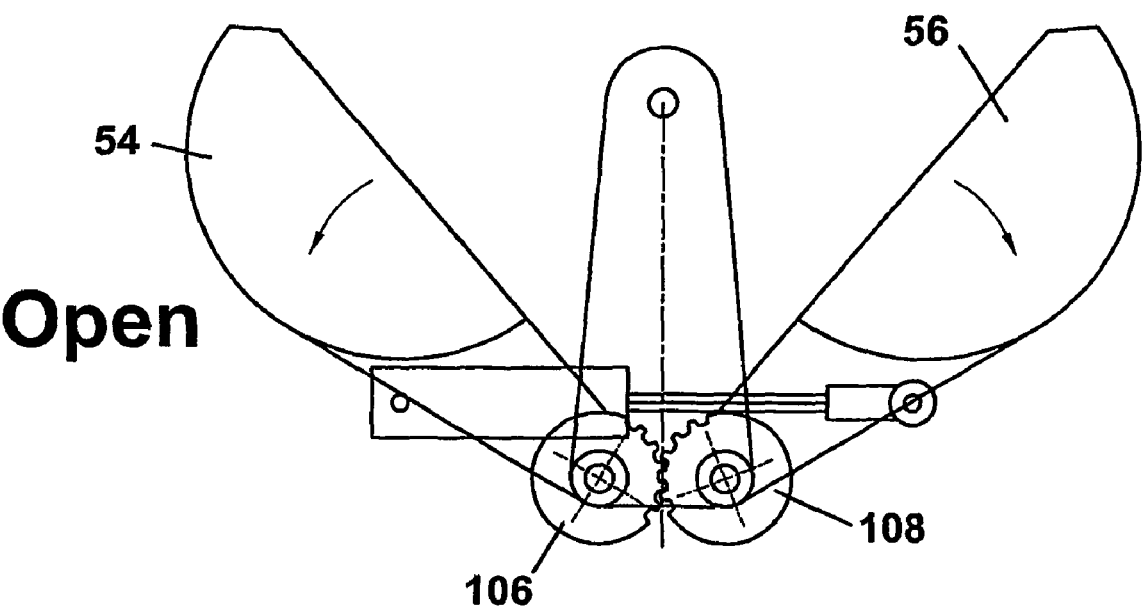

In FIG. 6 two meshing toothed wheels 106, 108 are keyed to the blades 54, 56 respectively and a piston and cylinder 109 acts on arms 110, 112 to open or close the blades. Zero torque results about 100.

Figure 7A:
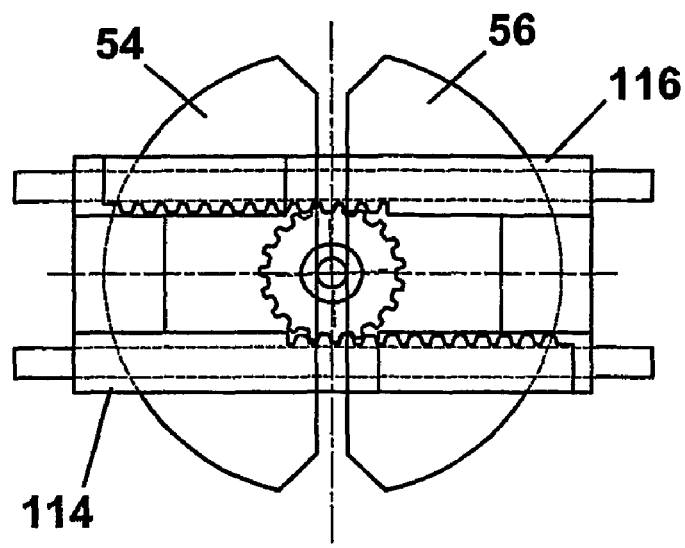
Figure 7B:
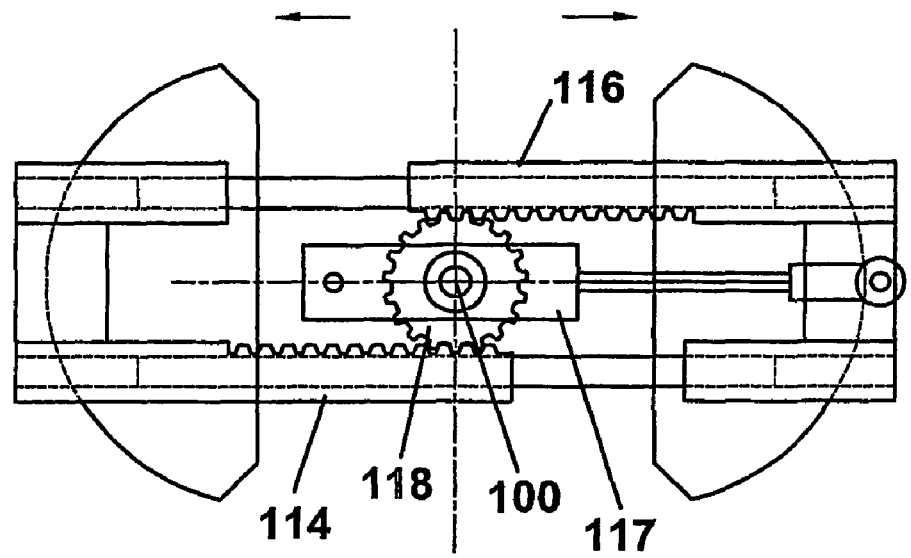

In FIG. 7 the blades 54, 56 are carried by parallel slides 114, 116 and relative sliding movement is effected by extending a cylinder and piston 117 acting for example between the bridge (not shown) and one of the slides 116. A pinion 118 is freely rotatable about the axis 100, and the teeth of the pinion engage in teeth formed in parallel spaced apart edges of the slides 114, 115. As slide 116 is moved to the right, slide 114 is moved to the left due to the rotation of the pinion 118. Zero torque results about 100.

In FIG. 8 a scissors mechanism 120 joins the two blades 54, 56 and a cylinder and piston 121 acts between two of the four outer ends 122, 124 of the mechanism. The other two outer ends 126, 128 are pivotable relative to the blades 54, 56. One of the intermediate joints 130 is slidable in a slot 132 in a fixed member 134.

Figure 8A:
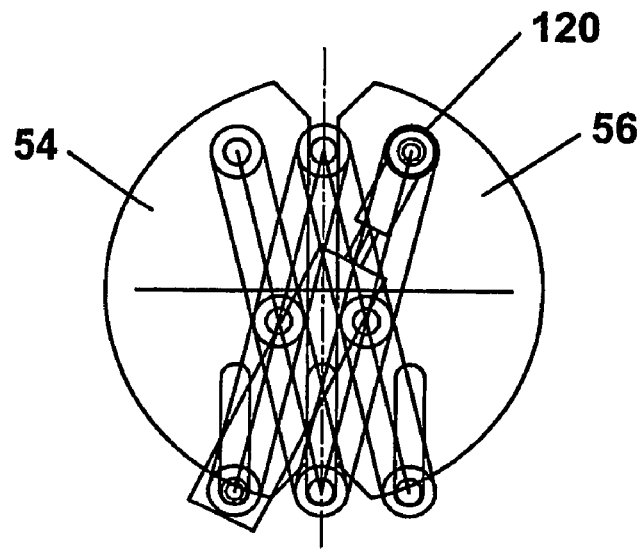
Figure 8B:
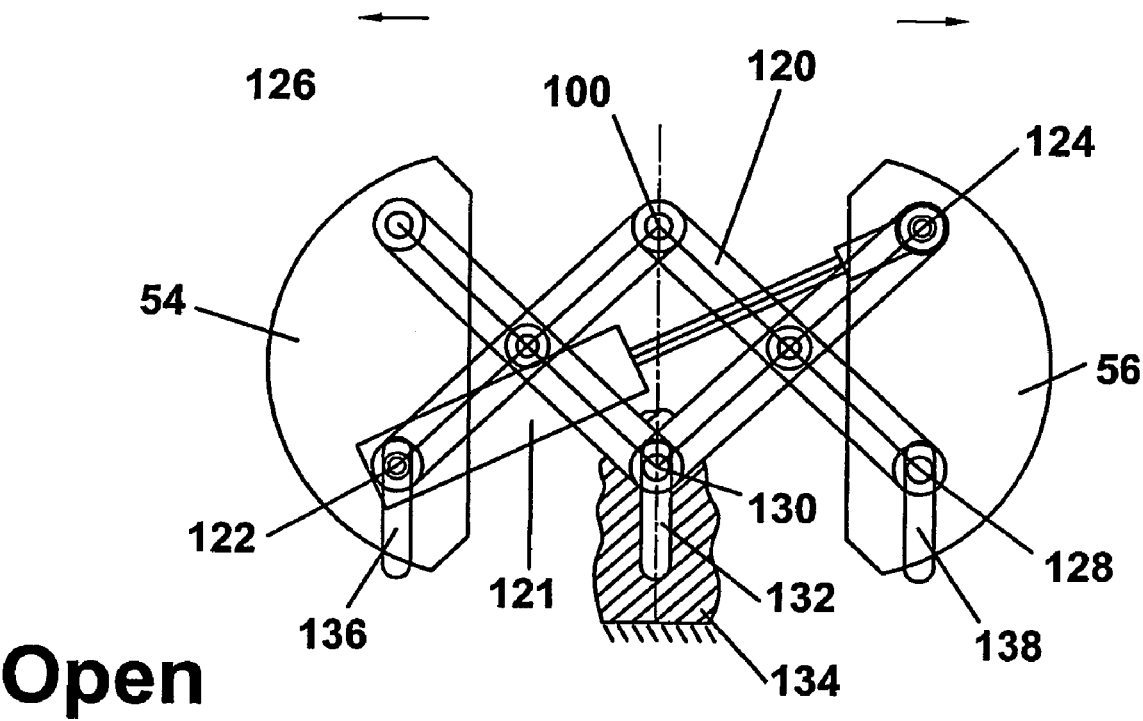

Relative sliding between joints 122 and 128 and the assembly is provided by slots 136, 138 in supporting arms to allow the blades to move together (as shown in FIG. 8A) and apart (as shown in FIG. 8B).

Zero torque is imposed on the second intermediate joint. To this end the axis 100 is arranged to coincide with this joint which remains stationary as the other five joints of the scissors mechanism move.

FIG. 9 shows an arrangement similar to that of FIG. 5 except that a mounting block 136 can pivot about 138 and a link 140 (pivotally attached to the link 58) also rotates about 138—which can also equate to axis 100 in FIG. 5.

There is a reduction in torque about 138 as the blades are no longer rotated. The block 136 and links and cylinder are rotated instead.

In FIG. 10 parallel links 142, 144 and 146, 148 are pivotally jointed at their ends to the blades 54, 56 and to the centre and a radially offset point of each of two meshing toothed pinions 150, 152. The central and offset points are denoted by 154, 156 and 158, 160 respectively.

The pinions are rotated by extending or retracting a cylinder and piston 161, which can be pivotally joined to the two pinions at 162, 164, or the piston is pivotally attached at 164 to a fixed part of the assembly such as a bridge member such as 22, 24 of FIGS. 2-4.

As the pinions counter rotate, the blades are moved together or apart, without any resultant torque.

Axis 166 is defined by the apex of a triangular support member 168 which in turn carries pins defining the rotational axes of 154 and 158, which are therefore fixed in position relative to each other, and to axis 166.

FIGS. 11 and 12 show tooling generally designated 170 such as illustrated in FIGS. 2 and 3 mounted at the lower end of a robotic arm generally designated 172 of the type illustrated in FIG. 1.

In addition the arm and tooling are shown located above two conveyors 174, 176 whose directions of movement are denoted by arrows 178, 180.

Pork chops are shown at 182, 184 on conveyor 174. These are spaced apart along the conveyor and may be oriented similarly or differently depending on how they are deposited on the conveyor from processing apparatus (not shown)—typically a high-speed cutting machine set to cut chops from a large piece of meat and cause them to drop in turn onto the conveyor.

One of a number of cameras is shown at 186. This is supplied with the robotic arm 172 and a computer based control system 188 having plural inputs 190 and plural outputs 192, controls the operation of the or each of two conveyors, the arm and possibly also an escapement mechanism (not shown) for spacing the chops along conveyor 174.

In use the arm is lowered with its blades 54, 56 is their fully open position under the control of the control system 188 at the precise moment that chop 182 arrives at the position shown in FIG. 11. The spikes (or fingers if the FIG. 4 variant is used) engage the upper surface of the chop 182 while the blades slide therebelow into the position shown in FIG. 12.

The arm is now operated so as to lift the chop 182 clear of the conveyors 174, 176 and to move the tooling so as now to be above the conveyor 176 to await the arrival of a tray 194 on conveyor 176 just below where the tooling will deposit chop 182 when located above conveyor 176, (or the movement of the tray 194 so that a first chop 196 already located therein is just ahead of where chop 182 will be deposited in the tray by the tooling 170).

The control system operates the tooling to open the blades to allow the chop 182 to drop into the tray above the trailing end of chop 196, so as to shingle the chops.

Moving the arm and tooling back to the position over conveyor 174 and repeating the procedure for the next chop 184 (and following chops in the line if required) and indexing tray 194 meanwhile by moving conveyor 176, allows a number of chops to be shingled into the tray 194.

The camera 186 (or another camera) inspects each chop to identify the fat edge region and thereby its orientation relative to the direction of conveyor movement, and further signals are generated by control system 188 to rotate the tooling (or the spiked plate 80 relative to the bridge 22, 24) so as to correctly orientate the chop 182 after it has been picked up from conveyor 174 and prior to it being deposited onto conveyor 176, so that each chop deposited thereon will bear a correct orientation relative to any other chops it is to be associated therewith. Thus chops may be shingled (as shown in FIG. 12) or may be arranged side by side in pairs, or threes, or fours in trays.

Other cameras may be provided to identify the orientation of the trays such as 194, to provide further reference signals for the control system to allow the chops to be rotated and positioned correctly relative to conveyor 176 and to trays carried thereon.

The chop cutting apparatus may shingle the meat as it is cut to form shingled groups of (say) four chops, as shown at 198 in FIG. 13. These are shown in plan view on the conveyor 174 in FIG. 13.

If the tooling is positioned around the group of chops 198 so that the two blades move inwards in the direction of the two arrows 200, 202 the shingled chops will not be disturbed significantly as the blades slide thereunder. Consequently the shingled group of chops 198 can be deposited as a single item into a waiting tray on the adjoining conveyor 176, instead of assembling a shingled group into a waiting tray one at a time, as previously described.

As before, shingled groups 198 can be rotated, each as a group, during transit from conveyor 174 to conveyor 176 so as to align with the appropriate dimension of each waiting tray on conveyor 176.

Stacks of bacon rashers (not shown) can be handles as single articles in the same way. Preferably the tooling is orientated so that the blades approach the rashers from opposite sides of the shorter dimension of the rashers forming the stack.

In FIGS. 14-16 the blades are denoted by 204, 206 and the support members by 208, 210. Pneumatic cylinders are denoted by 212, 214.

With both cylinders fully open (extended) the blades and support members will occupy the positions shown in FIGS. 14A-14D and are fully retracted. The spike assembly 216 is optional.

After lowering the tool onto product (not shown) so as to engage the latter by the spikes of assembly 216 (if fitted) cylinder 212 is closed thereby causing both pairs of blades and support members to move in synchronism inwardly to the position shown in FIGS. 15A-15D, thereby to engage the product between the support members 208, 210.

Thereafter cylinder 214 is also closed so as to move the blades inwardly relative to the support members to occupy the position shown in FIGS. 16A-16D.

Rotation of the product can be achieved by rotating the whole tool about the axis 218 (whether spikes are provided or not), and the presence of the support plates 208, 210 guarantees that whether spikes are present or not the product will rotate with the tool.

Delivery of the product onto a support surface is achieved by reversing the procedure after the tool has been lowered so that the product is positioned over the spot on which it is to rest. Thus cylinder 214 is first opened to retract the blades 204, 206 relative to the support members 208, 210 thereafter cylinder 212 is opened to move both blades and support plates clear of the product leaving it on, or to drop onto, the support surface (not shown).

If desired the cylinders 212, 214 may be mounted and operated differently from the manner shown in FIGS. 14-16, to enable the support plates to move outwardly relative to the blades 204, 206 and remain so displaced so as not to engage the product and permit the tool to operate as described in our co-pending Application.

Where the product is to be surrounded and engaged without penetration, the tool may be modified by removing the spike assembly 218 and fitting in place an assembly of displaceable pins/fingers as shown in FIGS. 17A, 17B. This comprises a support plate 220 containing an array of openings having cylindrical sleeves such as 222 which extend coaxially below the openings to serve as guides for a corresponding plurality of cylindrical pins such as 224 which have enlarged heads 226 to prevent their dropping through the openings in the plate 220. The lower ends of the pins are flat and may also be enlarged like the heads 226, to prevent them falling from the plate 220 if the tool is inverted.

Above the upper ends of the pins is located a plate 228 having a flat underside which is movable in a downward direction by extension of a pneumatic cylinder 230. The normal (retracted) position of the plate 228 allows pins such as 224 to move freely in an upward sense if their lower ends engage the upper surface of product such as shown at 232. Those pins which do not engage the product are not displaced and remain in their lower positions. In FIG. 17A pin 224 is shown elevated while another pin 234 is one which has not been elevated by product.

The length of the pins is selected so that even in their lower position the lower ends such as 236 of pin 234 will be clear of the blades 238, 240 shown in dotted outline in FIG. 17A, so that movement of the blades is not prevented by the pins which have not been pushed up by the product 232.

As best seen in the underside plan view of the plate and pin assembly of FIG. 17B pins such as 242, 244, 246 and 248 are very close to the sides of the product. Therefore if the latter tries to move as a result of frictional drag between the product and blades 238, 240 and the latter retract to release the product, it will only move to the extend permitted by pins such as 242, 244, 246 and 248, after which further lateral movement will be restrained y one or more of those pins, as the blades continue to retract.

Any tendency for the product to stick to the pins such as 224 which have been impaled on the upper surface of the product, can be overcome by driving the plate 228 downwardly by extending cylinder 230 as the tool is elevated relative to the product (after the blades 238, 240 have been retracted). This positive displacement of the pins also prevents any from sticking in an elevated position for any reason as a result of jamming in their guides 222 or becoming stuck in the latter due to a build up of product.

The drive 230 is optional if the plate 228 is heavy enough, and the latter can be dispensed with if the pins are heavy enough to reliably drop to their lowermost positions when the tool is raised clear of product.

In an alternative arrangement (not shown) closed cylinders may be provided above the openings in plate 220 in which the heads 226 are a sliding fit, and a supply of air under pressure is supplied to each cylinder above each pin head, which will drive the pin downwardly until the head engages the plate 220. If the heads are not an airtight fit, the air will leak around the head to relieve the pressure and reduce the force acting on the pins and/or a pressure relief valve may be employed if the pinheads are a close slipping fit like a piston in a cylinder.

The invention claimed is:

1. Tooling for picking up portions of foodstuff from a conveyor belt, by which in use articles can be picked up from one position and lowered into a second position, which tooling comprises:
   two blades each having a leading edge and trailing edge, and both being movable between a first position in which their leading edges are separated by a large gap and a second position in which the leading edges overlap, or are in contact or are separated by a smaller gap;
   a drive mechanism for effecting relative movement between the two blades for moving them between the first and second positions, whereby in use with the blades in the first position the tooling can be lowered so that the undersides of the two blades just make contact with a surface on which an article is resting with the two leading edges of the blades on opposite sides of the article and the article can be picked up by the blades by operating the drive mechanism so as to move the blades into their second position below the article; and
   a movement restraining mechanism including an article engaging arrangement, whereby the engagement between the article engaging arrangement and the article will resist lateral or rotational movement of the article relative to the article engaging arrangement as a result of the blades sliding below the article, and the article engaging arrangement is in use adapted to remain stationary while the blades move relatively thereto from their first to their second positions, wherein:
   the tooling is adapted to be secured to the moveable end of a computer-controlled robotic arm enabling the articles to be rotated in transit from said one position to the second position; and
   the movement restraining mechanism comprises at least one resiliently deformable member located above the plane containing the two blades and spaced therefrom by a distance which is less than the thickness of each article to be picked up by the tooling, so that in use as the tooling is lowered onto an article, the underside of the deformable member engages the upper surface of the article and becomes deformed in order to accommodate the thickness of the article before the blades make contact with a surface on which the article rests, the resulting downward force on the article, and frictional resistance to movement between the deformable member and the article, serving to restrain the article from moving under the influence of subsequent blade movement therebelow, either to pick up or to release the article.

2. Tooling as claimed in claim 1 wherein each of the trailing edges of the blades includes an upstanding lip or ridge or wall which in use will engage opposite edge regions of the article when the blades occupy their second position.

3. Tooling as claimed in claim 1, wherein the movement restraining mechanism comprises at least one spike which points generally perpendicularly towards a plane containing the two blades so that as the tooling is lowered onto an article the spike penetrates the article before the blades make contact with a surface on which the article rests, and wherein the movement restraining device further comprises ejector means which acts to push an article off the spike, as the blades move towards their second open position, so as in use to prevent an article remaining impaled on the spike, after the blades are opened to release the article.

4. Tooling as claimed in claim 1, wherein the movement restraining mechanism comprises at least one spike which points generally perpendicularly towards a plane containing the two blades so that as the tooling is lowered onto an article the spike penetrates the article before the blades make contact with a surface on which the article rests, and wherein the movement restraining device further comprises ejector means which acts to push an article off the spike, as the blades move towards their second open position, so as in use to prevent an article remaining impaled on the spike, after the blades are opened to release the article, and wherein the ejector means comprises at least one pin which is withdrawn upwardly as the blades move into their first, closed position but is moved downwardly into a protruding position as the blades move into their second, open position, so as to push an article in a similar downward direction, off the spike.

5. Tooling as claimed in claim 1, wherein the deformable member comprises a block of resiliently deformable material, a sprung plate or block, or a dished plate of spring steel or the like.

6. Tooling as claimed in claim 1, wherein the deformable member comprises at least one metal spring finger, having lateral stiffness but being adapted to deflect resiliently in an upward direction, relative to the blades.

7. Tooling as claimed in claim 1, wherein the deformable member comprises at least one metal spring finger which is bent so as to point downwardly to engage the upper surface of the article, but which can be more or less flattened by an upward force, so as to accommodate the thickness of the article.

8. Tooling as claimed in claim 1, wherein the movement restraining mechanism comprises a vacuum chuck which is adapted to become vacuum clamped to the upper surface of the article as the tooling moves downwardly onto the article, the vacuum clamping serving to resist movement of the article as the blades subsequently slide therebelow either to pick up or release the article.

9. Tooling as claimed in claim 1, wherein in use rotation of an article in transit between the first and second positions is achieved by rotating one part of the robotic arm relative to another part thereof, or by rotating the tooling relative to the robotic arm.

10. Tooling as claimed in claim 1, wherein:
a support member is positioned above each of the blades; and
a drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article.

11. Tooling as claimed in claim 1, wherein:
a support member is positioned above each of the blades; and
a drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article,
and wherein the drive mechanism only operates to disengage the support members from the article after the blades have moved from below the article.

12. Tooling as claimed in claim 1, wherein:
a support member is positioned above each of the blades; and
drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article,
and wherein the drive mechanism for the support members includes a lost motion connection in combination with a low spring rate compression spring which is compressed to the extent of an overrun created by the lost motion connection, and provides the lateral gripping force on the article when the support members are moved into article engagement, and also ensures that the lost motion is accommodated as the drive retracts.

13. Tooling as claimed in claim 1, wherein:
a support member is positioned above each of the blades; and
a drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article,
and wherein a first double acting pneumatic cylinder is adapted to move the blades and support members as a single unit, and a second double acting pneumatic cylinder is adapted to move the blades relative to the support members.

14. Tooling as claimed in claim 1, wherein:
a support member is positioned above each of the blades; and
a drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article,
and wherein each support member is in sliding contact with the upper surface of the blade with which it is associated, so that the relative movement during closure on product and/or during opening to release the product, acts in a self-cleaning manner in that the support member scrapes clean the upper surface of the blade.

15. Tooling as claimed in claim 1, wherein:
a support member is positioned above each of the blades; and
a drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article,
and wherein, after movement of the article to the said second position, the drive mechanism is operated to retract the blades so as to align with the inner faces of the support members,
and thereafter the drive mechanism is operated to retract both blades and support members in synchronism, by a distance just sufficient to release the article, so that the position of the article relative to the support surface remains substantially undisturbed from that determined by the position to which the tool has been moved.

16. Tooling as claimed in claim 1, wherein:
a support member is positioned above each of the blades; and
a drive mechanism is provided for moving each support member and each of the blades which in use operates to move both the support members and the blades until an article is gripped between the support members, and thereafter to move only the blades below the article,
the drive mechanism maintaining the support members in the article gripping position as the blades are subsequently withdrawn from below the article to prevent frictional drag on the underside of the latter from separating or moving the article, and wherein, after movement of the article to the said second position, the drive mechanism is operated to retract the blades so as to align with the inner faces of the support members, and thereafter the drive mechanism is operated to retract both blades and support members in synchronism, by a distance just sufficient to release the article, so that the position of the article relative to the support surface remains substantially undisturbed from that determined by the position to which the tooling has been moved, and wherein the tooling is raised vertically clear of the article while the support members continue to locate the article in position until the tooling has been raised clear thereof, after which the drive mechanism is operated to fully retract the support members and the blades.

17. Tooling as claimed in claim 1, wherein:

a support member is positioned above each of the blades; and a drive mechanism is provided for moving each support member and each of the blades which in use operates to move both the support members and the blades until an article is gripped between the support members, and thereafter to move only the blades below the article, the drive mechanism maintaining the support members in the article gripping position as the blades are subsequently withdrawn from below the article to prevent frictional drag on the underside of the latter from separating or moving the article, and wherein, after movement of the article to the said second position, the drive mechanism is operated to retract the blades so as to align with the inner faces of the support members, and thereafter the drive mechanism is operated to retract both blades and support members in synchronism, by a distance just sufficient to release the article, so that the position of the article relative to the support surface remains substantially undisturbed from that determined by the position to which the tooling has been moved, and wherein the tooling is raised vertically clear of the article while the support members continue to locate the article in position until the tooling has been raised clear thereof, after which the drive mechanism is operated to fully retract the support members and the blades and wherein the step of fully retracting the support members and blades is effected in transit as the tooling returns to pick up another article.

18. Tooling as claimed in claim 1, wherein the restraining means comprises an array of spaced apart displaceable elongate rod-like fingers which are mounted so as to extend generally normal to the plane containing the two blades, so that in use as the tool is lowered over an article with the blades retracted the lower ends of some of the fingers will engage the upper surface of the article and as a consequence will be pushed upwardly as the tool continues to move downwardly over and around the article, but other of the fingers which do not register with the article will not be pushed upwardly but will remain extended and will surround the article and in use will provide lateral support therefor as the blades subsequently move relative to the underside of the article both inwardly and outwardly.

19. Tooling as claimed in claim 1, wherein the mechanism by which the two blades and/or support members (if provided) are caused to move exerts negligible torque about the torsion drive axis of the robotic arm and/or about the rotational axis between the arm and the tooling and/or about any axis about which one part of the arm can rotate relative to another part thereof.

20. Tooling as claimed in claim 1, wherein the drive mechanism acts equally and oppositely on the two blades.

21. Tooling as claimed in claim 1, wherein:

a support member is positioned above each of the blades; and a drive mechanism is provided for moving each support member and each of the blades which in use operates to move both the support members and the blades until an article is gripped between the support members, and thereafter to move only the blades below the article, the drive mechanism maintaining the support members in the article gripping position as the blades are subsequently withdrawn from below the article to prevent frictional drag on the underside of the latter from separating or moving the article, and wherein the drive mechanism acts equally and oppositely on the two support members.

22. Tooling as claimed in claim 1, wherein the drive means acts on one of the blades and a connection between the two blades transmits drive to the other blade so as to cause each to move in an appropriate manner.

23. Tooling as claimed in claim 1, wherein a support member is positioned above each of the blades, and drive means is provided for moving each support member and each of the blades which in use operates to move both the support members and the blades until an article is gripped between the support members, and thereafter to move only the blades below the article, the drive means maintaining the support members in the article gripping position as the blades are subsequently withdrawn from below the article to prevent frictional drag on the underside of the latter from separating or moving the article, wherein the drive means acts on one of the support members and a connection is provided between the two support members to transmit drive to the other support member so as to cause each support member to move in an appropriate manner.

24. Tooling as claimed in claim 1, wherein the robotic arm includes a rotational drive, for rotating tooling attached thereto relative to the arm, whereby in use this is employed for orientating the tooling and therefore an article therein, during transit.

25. Tooling as claimed in claim 1, wherein:

in use, just prior to their inward sliding movement below an article, the blades are pressed into contact with the flat support surface on which the article is carried; and a resilient lost motion connection is provided between the blades and the robotic arm, which permits the blades to make contact with the article support surface shortly before the downward movement of the end of the robotic arm carrying the tooling is stopped, and during the final movement of the robotic arm in which the resilient lost motion connection is compressed after the blades make contact with the said surface, the energy stored in the compression of the resilient lost motion connection serves to exert a downward force on the blades which is resisted by the said surface, thereby to keep the blades in sliding contact therewith as they move towards and slide under the article, to enable the blades to close to their second position.

26. Tooling as claimed in claim 1, wherein:

in use, just prior to their inward sliding movement below an article, the blades are pressed into contact with the flat support surface on which the article is carried; and a resilient lost motion connection is provided between the blades and the robotic arm, which permits the blades to make contact with the article support surface shortly before the downward movement of the end of the robotic arm carrying the tooling is stopped, and during the final movement of the robotic arm in which the resilient lost motion connection is compressed after the blades make contact with the said surface, the energy stored in the compression of the resilient lost motion connection serves to exert a downward force on the blades which is resisted by the said surface, thereby to keep the blades in sliding contact therewith as they move towards and slide under the article, to enable the blades to close to their second position, and wherein the lost motion connection is between the robotic arm and the tooling.

27. Tooling as claimed in claim 1, wherein:

in use, just prior to their inward sliding movement below an article, the blades are pressed into contact with the flat support surface on which the article is carried; and a resilient lost motion connection is provided between the blades and the robotic arm, which permits the blades to make contact with the article support surface shortly before the downward movement of the end of the robotic arm carrying the tooling is stopped, and during the final movement of the robotic arm in which the resilient lost motion connection is compressed after the blades make contact with the said surface, the energy stored in the compression of the resilient lost motion connection serves to exert a downward force on the blades which is resisted by the said surface, thereby to keep the blades in sliding contact therewith as they move towards and slide under the article, to enable the blades to close to their second position, and wherein the drive mechanism is torsionally stiff in a plane parallel to that in which the blades move but is capable of flexing or distorting or rising and falling as by pivoting in a plane which is perpendicular to the plane in which the blades move, so as to accommodate the lost motion between the blades and the bridge.

28. Tooling as claimed in claim 1, wherein the blades and support members rotate relative to one another or slide linearly relative to each other.

29. Tooling as claimed in claim 1, in which the blades and support members are carried below a bridge, and the gap between the bridge and the blades is adjustable to allow different heights of article to be accommodated within the tooling.

30. Tooling as claimed claim 1, wherein the article comprises two or more foodstuff portions, in a shingled array on the conveyor, and the tooling picks and places the shingled array without disturbing the relationship of the shingled portions.

31. Tooling as claimed claim 1, wherein:

the article comprises two or more foodstuff portions, in a shingled array on the conveyor, and the tooling picks and places the shingled array without disturbing the relationship of the shingled portions and wherein the tooling is orientated relative to the shingled array so that the two blades (and if provided the support members) advance towards the array along a line which is generally orthogonal to the direction in which the portions are shingled.

32. Tooling as claimed in claim 1, in combination with a viewing system which provides image signals to a robotic-arm-controlling computer, wherein:

the computer is programmed to determine the orientation of each article to be picked up, and to generate control signals for rotating the tooling accordingly.

33. A product handling system comprising:

a first conveyor;

a second conveyor spaced from the first;

a robotic arm and computer control therefor, and having tooling as claimed in claim 1 attached to its remote movable end, both arm and tooling being controllable by signals from the computer control to position the tooling around an article on one conveyor, to slide the blades thereof below the article, and thereafter lift the article from the one conveyor by appropriately controlling the robotic arm, to move the arm and therefore the article-containing tooling so as to position it over the other conveyor, and thereafter to open the blades and deposit the article on the other conveyor.

34. A product handling system comprising:

a first conveyor;

a second conveyor spaced from the first;

a robotic arm and computer control therefor, and having tooling as claimed in claim 1 attached to its remote movable end, both arm and tooling being controllable by signals from the computer control to position the tooling around an article on one conveyor, to slide the blades thereof below the article, and thereafter lift the article from the one conveyor by appropriately controlling the robotic arm, to move the arm and therefore the article-containing tooling so as to position it over the other conveyor, and thereafter to open the blades and deposit the article on the other conveyor, wherein the system includes a camera and sensor which produce signals which are supplied to the computer, the computer is programmed to determine therefrom the position and/or orientation and/or nature of each article on the said one conveyor, and to generate control signals to cause drives to operate to lift and/or rotate and/or lower the tooling and/or adjust the robotic arm so that the tooling is positioned at just the right time relative to an article travelling on the one conveyor to enable the tooling to pick it up therefrom, and if required to rotate it in transit, and thereafter position it on the other conveyor at precisely the right point in time and in the correct orientation, and wherein said other conveyor has trays or other containers thereon, the camera system and sensor are set up so as to enable the computer to identify the precise position of each tray or container relative to the robotic arm, and the computer is programmed to control the movement of the said other conveyor as well as the said one conveyor, to ensure that a specific tray or container is at a specific position at a specific time to allow a specific article picked from the one conveyor to be placed in the said tray or container by the tooling carried by the robotic arm.

35. A method for picking up a portion of foodstuff from a conveyor belt from one position and lowering it into a second position with tooling, the tooling being adapted to be secured to the moveable end of a computer-controlled robotic arm enabling an article to be rotated in transit from said one position to the second position, which tooling comprises:

two blades each having a leading edge and a trailing edge, with both being moveable between a first position in which their leading edges are separated by a large gap and a second position in which the leading edges overlap, or are in contact or are separated by a smaller gap;

a drive mechanism for effecting relative movement between the two blades for moving them between the first and second positions; and a movement restraining mechanism including an article engaging arrangement, the movement restraining mechanism comprising at least one resiliently deformable member located above the plane containing the two blades, the method comprising the steps of:

lowering the tooling with the blades in the first position so that the undersides of the two blades just make contact with the surface on which an article is resting with the two leading edges of the blades on opposite sides of the article, the deformable member being spaced above the plane containing the two blades by a distance less than the thickness of the article to be picked up by the tooling, so that as the tooling is lowered, the underside of the deformable member engages the upper surface of the article and becomes deformed in order to accommodate the thickness of the article before the blades make contact with the surface on which the article rests, the resulting downward force on the article, and frictional resistance to movement between the deformable member and the article serving to restrain the article from moving under the influence of subsequent blade movement therebelow, either to pick up or to release the article, the engagement between the article engaging arrangement and the article resisting lateral or rotational movement of the article relative to the article engaging arrangement as a result of the blades sliding below the article; and operating the drive mechanism so as to move the blades into their second position below the article so that the article can be picked up by the blades, the article engaging arrangement remaining stationary while the blades move relatively thereto from their first to their second positions.

* * * * *